US009392278B2

(12) United States Patent
Hattori

(10) Patent No.: US 9,392,278 B2
(45) Date of Patent: Jul. 12, 2016

(54) IMAGE ENCODING OR DECODING APPARATUS, SYSTEM, METHOD, AND STORAGE MEDIUM FOR ENCODING OR DECODING A PLURALITY OF IMAGES IN PARALLEL

(71) Applicant: CANON KABUSHIKI KAISHA, Tokyo (JP)

(72) Inventor: Hideaki Hattori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 454 days.

(21) Appl. No.: 13/949,801

(22) Filed: Jul. 24, 2013

(65) Prior Publication Data

US 2014/0029671 A1   Jan. 30, 2014

(30) Foreign Application Priority Data

Jul. 26, 2012   (JP) ................................. 2012-165945

(51) Int. Cl.
  *H04N 7/36* (2006.01)
  *H04N 19/51* (2014.01)
  *H04N 19/43* (2014.01)
  *H04N 19/436* (2014.01)

(52) U.S. Cl.
  CPC ......... *H04N 19/00684* (2013.01); *H04N 19/43* (2014.11); *H04N 19/436* (2014.11)

(58) Field of Classification Search
  None
  See application file for complete search history.

(56) References Cited

U.S. PATENT DOCUMENTS

| 5,818,607 | A | * | 10/1998 | Nakamura | ........... | H04N 1/4175 |
|---|---|---|---|---|---|---|
| | | | | | | 358/426.02 |
| 2007/0217519 | A1 | * | 9/2007 | Murayama | ........... | H04N 19/114 |
| | | | | | | 375/240.25 |
| 2009/0029671 | A1 | * | 1/2009 | Cho | ........................ | G01C 21/34 |
| | | | | | | 455/345 |
| 2013/0202051 | A1 | * | 8/2013 | Zhou | .................... | H04N 19/436 |
| | | | | | | 375/240.26 |

FOREIGN PATENT DOCUMENTS

| JP | 2003-219428 A | 7/2003 |
|---|---|---|
| JP | 2006-014113 A | 1/2006 |
| JP | 2010-515336 A | 5/2010 |
| JP | 2011-029863 A | 2/2011 |

OTHER PUBLICATIONS

Tiles for parallel decoding, JCT-VC-E412, Mar. 16-23, 2011, Misra et al.*
Tiles, JCT-VC-F335, Jul. 14-22, 2011, Fuldseth.*
ITU-T H.264 (Jan. 2012) "Advanced video coding for generic audio visual services", pp. 1-657.
Joint Collaborative Team on Video Coding (JCT-VC), document JCTVC-F335, Jul. 2011, pp. 1-15.

* cited by examiner

*Primary Examiner* — Sath V Perungavoor
*Assistant Examiner* — Janese Duley
(74) *Attorney, Agent, or Firm* — Canon USA Inc. IP Division

(57) ABSTRACT

An image encoding apparatus includes a first encoding unit configured to encode an N-th image of a plurality of images and a second encoding unit configured to encode an (N+1)th image, which is continuous to the N-th image, with reference to the N-th image. The processing system adaptively determines processing start timing based on a motion vector presence range of an initial processing target block of the (N+1)th image, which is a part of the N-th image.

15 Claims, 16 Drawing Sheets

FIG.5

| LEVEL | ENCODING PARAMETER RESTRICTIONS | |
|---|---|---|
| | MAXIMUM PICTURE SIZE (MAXIMUM NUMBER OF MACROBLOCKS) | MAXIMUM MOTION VECTOR VALUE IN VERTICAL DIRECTION [PIXEL] |
| 1 | 99 | -32 ~ +31.75 |
| 2 | 396 | -64 ~ +63.75 |
| 3 | 1620 | -128 ~ +127.75 |
| 4 | 8192 | -256 ~ +255.75 |

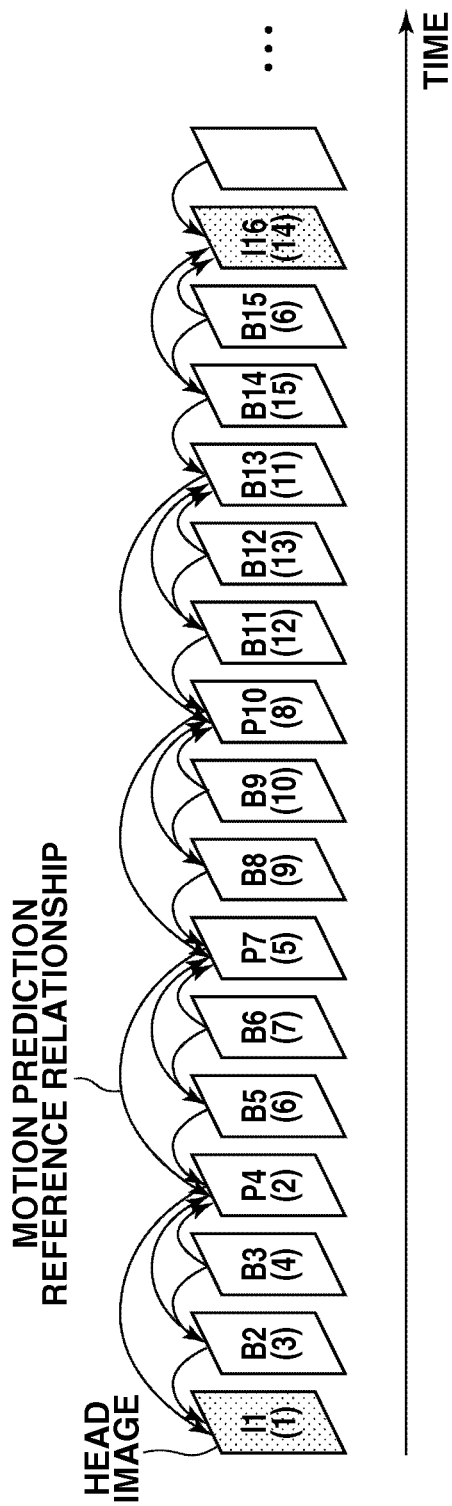

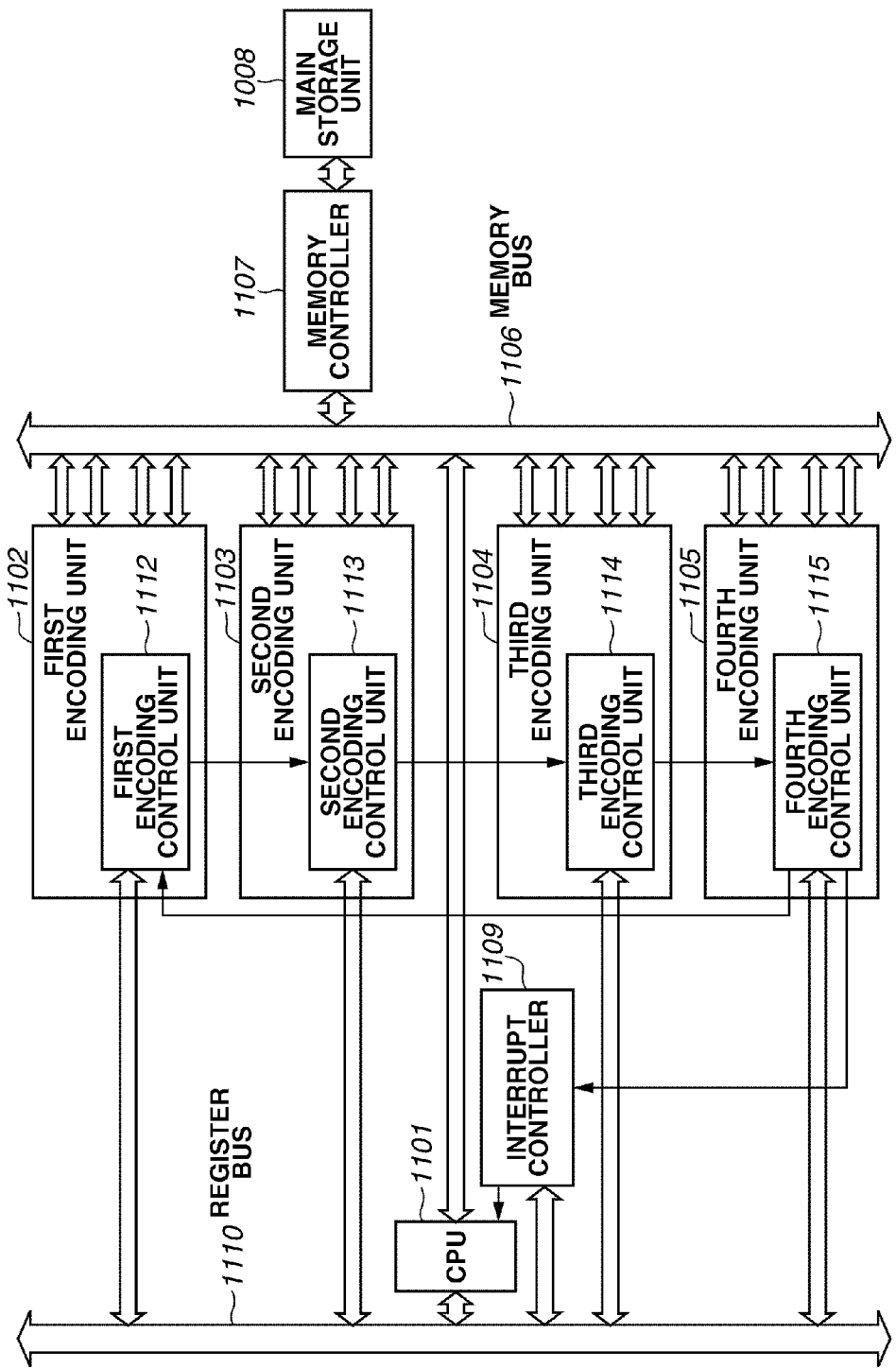

IMAGE ENCODING OR DECODING APPARATUS, SYSTEM, METHOD, AND STORAGE MEDIUM FOR ENCODING OR DECODING A PLURALITY OF IMAGES IN PARALLEL

BACKGROUND OF THE INVENTION

1. Field of the Invention

The present disclosure generally relates image encoding and, more particularly, to an image encoding apparatus, an image encoding system, an image encoding method, and a storage medium, an image decoding apparatus, an image decoding system, and an image decoding method, and a storage medium. More particularly, the present disclosure generally relates to a system that can encode and decode a plurality of images in parallel.

2. Description of the Related Art

H.264/MPEG-4 AVC (hereinafter, referred to as "H.264") is a conventionally known moving image encoding method (see ITU-T H.264 (03/2010) Advanced video coding for generic audio visual services).

Recently started activity for a succession of H.264 includes promoting international standardization of a highly efficient encoding method, and Joint Collaborative Team on Video Coding (JCT-VC) has been established for ISO/IEC and ITU-T. JCT-VC advances the standardization of High Efficiency Video Coding (hereinafter, referred to as "HEVC") (see JCT-VC (Contribution) JCTVC-F335).

Two types of encoding employed in H.264 or HEVC to improve the encoding efficiency are intra-picture prediction encoding that performs encoding using a correlation in a screen (hereinafter, referred to as "intra-picture encoding") and inter-picture prediction encoding that performs encoding using a correlation between screens to predict a motion (hereinafter, referred to as "inter-picture encoding"). The inter-picture encoding includes searching a motion vector indicating the magnitude of a motion from an image to be referred to in encoding each block (hereinafter, referred to as "reference image") to an encoding target image (hereinafter, referred to as "target image"). Similar to a prediction residual of the target image, the searched motion vector is subjected to encoding and is multiplexed as a part of an encoded stream (i.e., an output of the image encoding apparatus).

Further, in accordance with an increase in the size of a moving image and the number of frames per second, it is desirable to record and reproduce a video having a high image quality compared to a conventional moving image. In a case where such a high-quality video is encoded in real time, a single image encoding apparatus is generally insufficient in processing performance. Therefore, using a plurality of image encoding apparatuses may be useful in performing encoding processing on a plurality of images in parallel.

Further, as discussed in Japanese Patent Application Laid-Open No. 2003-219428, it is necessary for an image encoding apparatus and an image decoding apparatus to use the same image as a reference image to be used in the motion vector search of the inter-picture encoding. Therefore, it is general that the reference image is generated through internal decoding (generally referred to as "local decoding") processing performed by the image encoding apparatus.

In a case where a plurality of image encoding apparatuses is used to perform inter-picture encoding processing on a plurality of images in parallel, each image encoding apparatus uses a temporally neighboring image as a reference image. However, in this case, the same reference image used in the inter-picture encoding may be currently encoded or locally decoded by another image encoding apparatus. In such a situation, the image encoding apparatus cannot start inter-picture encoding before another image encoding apparatus completes the encoding or the local decoding of the reference image. The image encoding apparatus cannot perform parallel encoding processing on a plurality of images.

To eliminate the above-mentioned adverse dependency between images in the inter-picture prediction, it may be useful to use a temporally distant image as a reference image in performing the parallel encoding processing on a plurality of images. However, in the inter-picture encoding, it is general that the correlation between two images is strong when these images are temporally adjacent to each other. Accordingly, the compression efficiency deteriorates when a temporally distant image is used as a reference image in the inter-picture encoding, compared to a case where a temporally adjacent image is used as a reference image in the inter-picture encoding. As a result, the data size of an encoded stream (i.e., an output of the image encoding apparatus) becomes greater.

SUMMARY OF THE INVENTION

In view of the above-mentioned problems, the present disclosure is directed to an image encoding apparatus capable of attaining high performances in processing with a plurality of encoding units without depending on the configuration of a specific encoded stream, while maintaining high encoding efficiency.

According to an aspect of the present disclosure, an image encoding apparatus is configured to encode a plurality of images that is temporally continuous on a block-by-block basis. The image encoding apparatus includes a first encoding unit configured to encode an N-th image of the plurality of images, a second encoding unit configured to encode an (N+1)th image, which is continuous to the N-th image, with reference to the N-th image, a recording unit configured to record a number of block lines processed by the first encoding unit, and a control unit configured to control processing start timing for the first encoding unit and the second encoding unit. The control unit is configured to instruct the second encoding unit to start encoding an initial processing target block of the (N+1)th image after the number of block lines recorded by the recording unit reaches a number of block lines that include a motion vector presence range, which is a range in which a motion vector is possibly present.

An image encoding apparatus according to the present disclosure can improve encoding processing performances by causing a plurality of encoding units to perform parallel encoding processing on a plurality of images while maintaining higher encoding efficiency. Further, an image decoding apparatus according to the present disclosure can improve decoding processing performances by causing a plurality of decoding units to perform parallel decoding processing on a plurality of images.

Further features and aspects of the present disclosure will become apparent from the following detailed description of exemplary embodiments with reference to the attached drawings.

BRIEF DESCRIPTION OF THE DRAWINGS

FIG. 5 is a table indicating maximum motion vector values in a vertical direction, in respective levels, according to a second exemplary embodiment.

FIG. 9 illustrates an image encoding method and a reference relationship between images according to a fourth exemplary embodiment.

FIG. 11 illustrates an image encoding apparatus according to a sixth exemplary embodiment.

DESCRIPTION OF THE EMBODIMENTS

Figure 1:
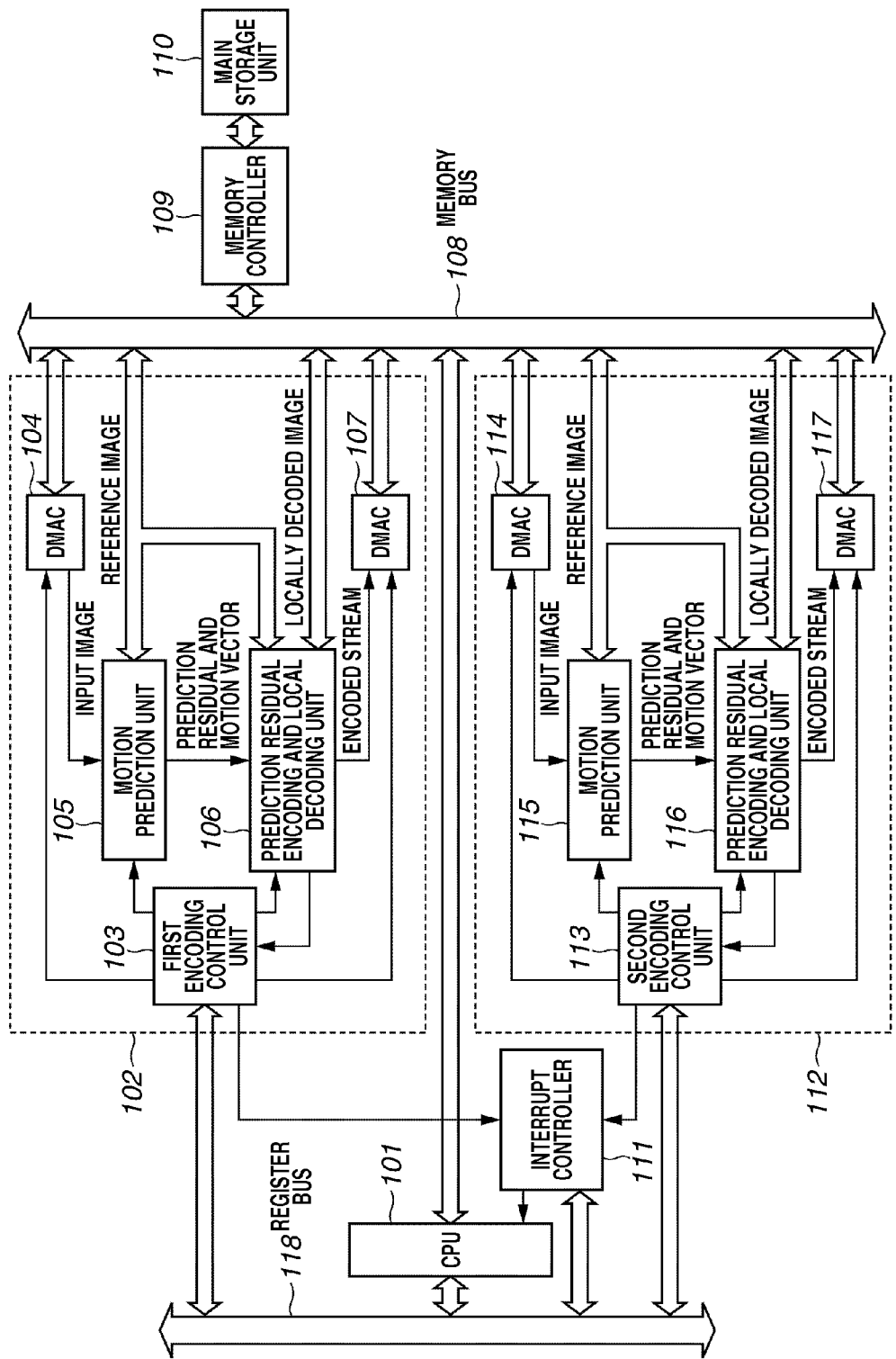
FIG. 1 illustrates an image encoding apparatus according to a first exemplary embodiment.

A first exemplary embodiment of the present disclosure is described in detail below with reference to attached drawings. FIG. 1 illustrates an image encoding apparatus according to the first exemplary embodiment.

The image encoding apparatus illustrated in FIG. 1 includes a central processing unit (CPU) 101, a first encoding unit 102, a second encoding unit 112, a memory bus 108, a memory controller 109, a main storage unit 110, an interrupt controller 111, and a register bus 118. The image encoding apparatus described in the present exemplary embodiment can encode a moving image (i.e., a group of a plurality of images that is temporally continuous). As used herein, the term "unit" generally refers to any combination of software, firmware, hardware, or other component that is used to effectuate a purpose.

Figure 2:
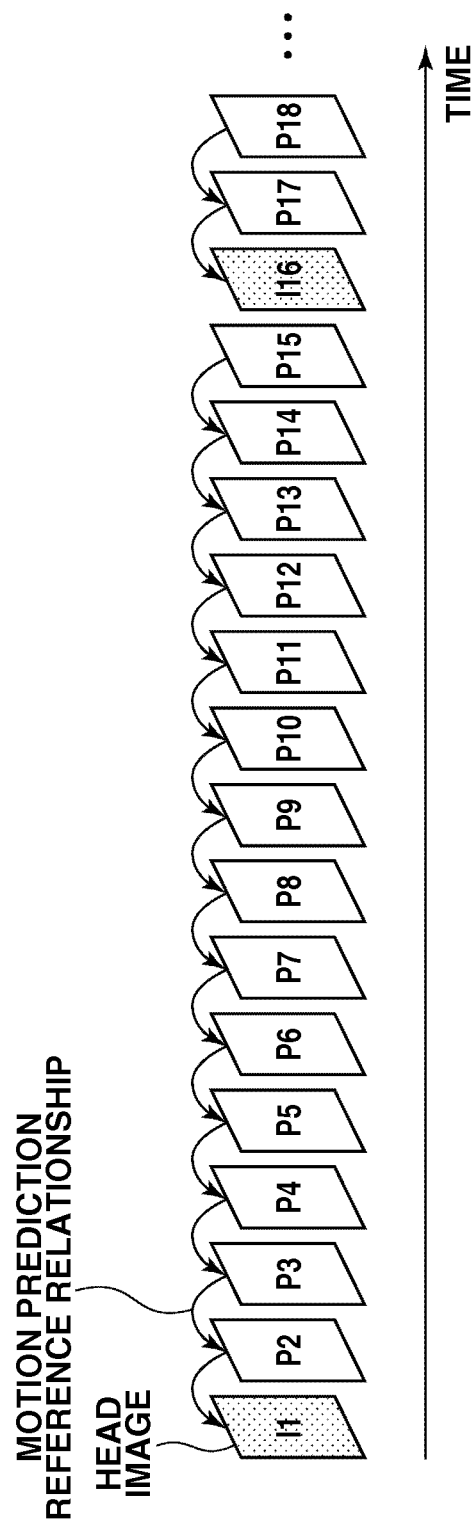
FIG. 2 illustrates an image encoding method and a reference relationship between images according to the first exemplary embodiment.

An encoding method that can be realized by the first encoding unit 102 illustrated in FIG. 1 is described in detail below with reference to FIG. 2. FIG. 2 illustrates an image encoding method according to the present exemplary embodiment.

In the present exemplary embodiment, one of fifteen images (e.g., 1st and 16th images illustrated in FIG. 2) is subjected to intra-picture prediction encoding to be performed based on intra-picture prediction (hereinafter, referred to as "intra-picture encoding"). In FIG. 2, each of I1 and I16 represents an image to be subjected to the intra-picture encoding. The remaining images (e.g., 2nd to 15th images) are subjected to inter-picture encoding to be performed based on motion prediction. In FIG. 2, each arrow indicates a reference relationship between images in the motion prediction. Each image to be subjected to the inter-picture encoding uses an immediately past image as a reference image. In FIG. 2, each image that uses one reference image is represented by P2, P3, . . . .

In the present exemplary embodiment, a group including intra-picture encoded images and inter-picture encoded images is referred to as "image group." In FIG. 2, fifteen images I1 to P15 constitute one image group. Further, the reference relationship between images in the inter-picture encoding to be performed based on motion prediction is referred to as "image group structure."

In the present exemplary embodiment, the first encoding unit 102 illustrated in FIG. 1 performs encoding processing on odd-numbered (i.e., first, third, fifth, . . . , and (2N−1)th) images illustrated in FIG. 2, in which N is an arbitrary positive integer (N>0). On the other hand, the second encoding unit 112 performs encoding processing on even-numbered (i.e., second, fourth, sixth, . . . , and 2N-th) images. Further, when the first encoding unit 102 has encoded an N-th image, the second encoding unit 112 can encode an (N+1)th image with reference to the encoded N-th image.

The first encoding unit 102 includes a first encoding control unit 103, direct memory access controllers (DMAC) 104 and 107, a motion prediction unit 105, and a prediction residual encoding and local decoding unit 106. The second encoding unit 112 has an internal configuration that is similar to that of the first encoding unit 102.

Figure 3:
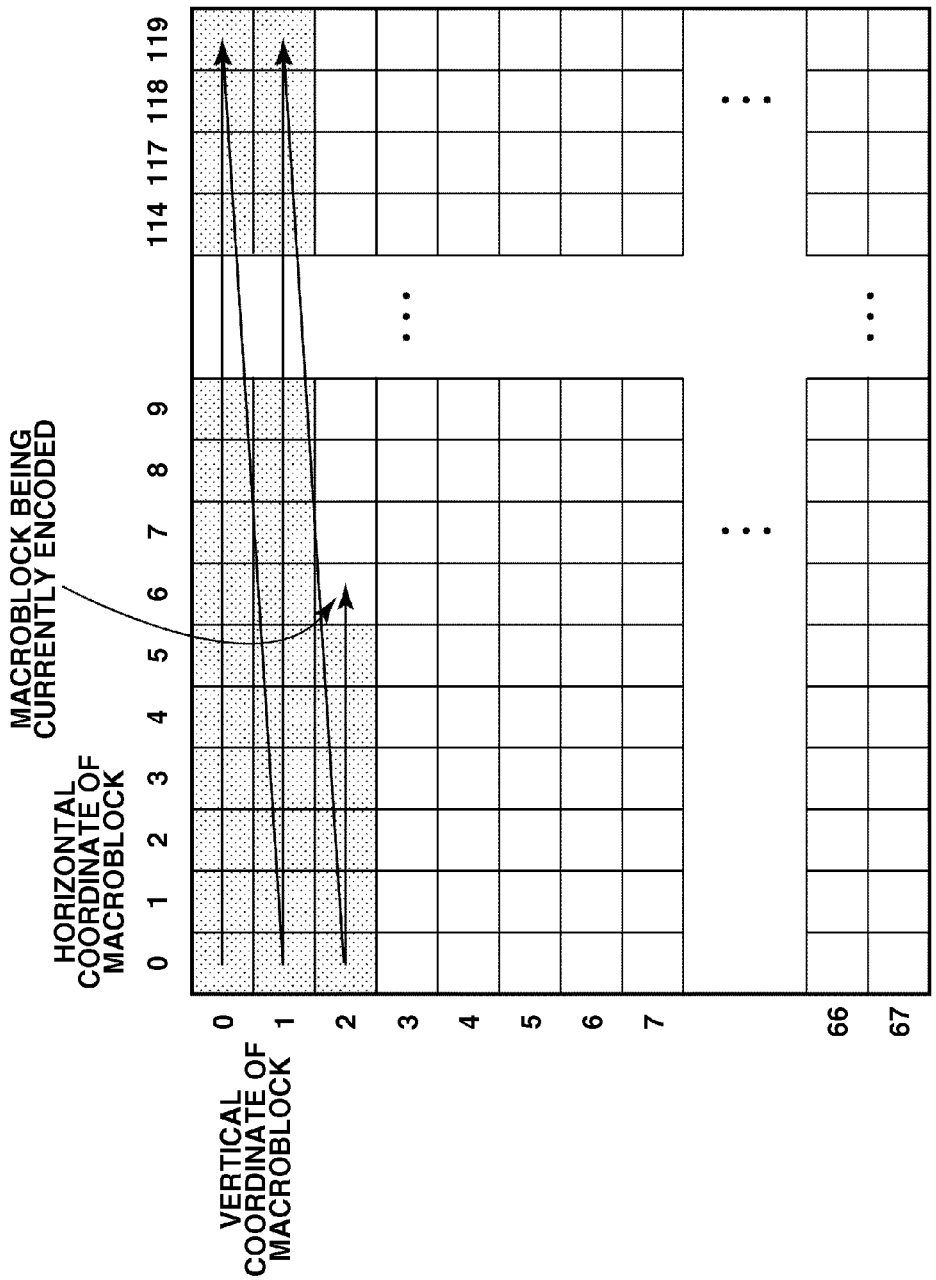
FIG. 3 illustrates a plurality of macroblocks that constitutes an image according to the first exemplary embodiment.

In the present exemplary embodiment, each of the first encoding unit 102 and the second encoding unit 112 can perform encoding for each macroblock, which is a block including 16 pixels in the horizontal direction and 16 pixels in the vertical direction (hereinafter, referred to as 16×16 pixels in the present exemplary embodiment, although the number of pixels that constitute a macroblock is changeable). FIG. 3 illustrates a relationship between an input image (i.e., an encoding target) and macroblocks according to the present exemplary embodiment. The input image according to the present exemplary embodiment has a size of 1920×1088 pixels, which includes 120 macroblocks in the horizontal direction and 68 macroblocks in the vertical direction. More specifically, in the present exemplary embodiment, one macroblock is a part of the input image. In general, each encoding unit performs image encoding for respective blocks according to a raster/scanning order. For example, as illustrated in FIG. 3, the order of the image encoding applied to respective macroblocks is (0, 0)→(1, 0)→(2, 0)→(abbr.)→ (119, 0)→(0, 1)→ . . . →(119, 1)→ . . . →(119, 67). When (X, Y) expresses a target macroblock, X represents a coordinate position in the horizontal direction and Y represents a coordinate position in the vertical direction.

The CPU 101 can set encoding parameters that are stored in registers provided in the first encoding control unit 103 and a second encoding control unit 113 via the register bus 118. The encoding parameters include parameters to be used in encoding processing, such as quantization parameters and information that determines whether to perform intra-picture encoding processing or inter-picture encoding processing on an image to be processed. After the encoding parameters have been stored in the registers provided in the first encoding control unit 103 and the second encoding control unit 113, the CPU 101 instructs, through register settings, the first encoding control unit 103 and the second encoding control unit 113 to start an encoding operation. The register settings, which can be determined based on a user operation or an external operation instruction, generally include encoding parameter settings and operation settings. Further, as described below, the CPU 101 reads the number of encoded macroblock lines from the first encoding control unit 103 and the second encoding control unit 113 via the register bus 118.

A memory transfer request, if it is issued from the CPU 101, the first encoding unit 102, or the second encoding unit 112, can be transmitted to the memory controller 109 via the memory bus 108. The memory controller 109 can convert the memory transfer request, when it is transmitted via the memory bus 108, into a command to be supplied to the main storage unit 110 to perform data reading and writing operations. The main storage unit 110 can store writing requested data or output reading requested data based on a command supplied from the memory controller 109.

In the present exemplary embodiment, it is supposed that input image generation processing (for example, reading an image with an image sensor and performing A/D conversion and developing processing in a digital camera) can be performed quickly, and the input image is stored in the main storage unit 110 is a constantly usable state.

Internal operations that can be performed by the first encoding unit 102 and the second encoding unit 112 are described in detail below.

The first encoding control unit 103 receives an operation start command from the CPU 101 via the register bus 118, and controls internal processing. The DMAC 104 reads an input image from the main storage unit 110 on a macroblock-by-macroblock basis, and outputs the read image to the motion prediction unit 105 via the register bus 118. The motion prediction unit 105 reads a necessary reference image area from the main storage unit 110, to perform an inter-picture prediction for each input macroblock received from the DMAC 104. The motion prediction unit 105 performs motion vector search processing based on a predetermined motion vector search algorithm.

The motion prediction unit 105 determines a motion vector, as a motion vector to be used in the encoding, when it is estimated that the amount of coding to be generated for the motion vector is smallest. The motion prediction unit 105 outputs a prediction residual obtained through the motion prediction using the determined motion vector to the prediction residual encoding and local decoding unit 106. Further, the motion prediction unit 105 outputs the motion vector to be used in the encoding to the prediction residual encoding and local decoding unit 106. If the encoding target image is an image to be subjected to the intra-picture encoding, the motion prediction unit 105 directly outputs an input macroblock to the prediction residual encoding and local decoding unit 106.

The prediction residual encoding and local decoding unit 106 performs prediction residual encoding processing on the prediction residual output from the motion prediction unit 105. The prediction residual encoding to be applied to the prediction residual generally includes orthogonal transformation, quantization, and entropy encoding. In other words, in performing the prediction residual encoding, it is not always necessary to include all of the orthogonal transformation, the quantization, and the entropy encoding. For example, a prediction residual encoding method employable when the target is a still image needs not include the quantization. Further, the prediction residual encoding and local decoding unit 106 performs prediction and entropy encoding for the motion vector received from the motion prediction unit 105 based on a peripheral motion vector included in the same image.

The encoded prediction residual and the motion vector are multiplexed as an encoded stream. The multiplexed encoded stream is stored in the main storage unit 110 via the DMAC 107. If the target image is an image to be subjected to the intra-picture encoding, the prediction residual encoding and local decoding unit 106 performs the prediction residual encoding after completing the intra-picture prediction for the input macroblock.

Further, the prediction residual encoding and local decoding unit 106 performs inverse quantization and inverse orthogonal transformation on the prediction residual having been subjected to the orthogonal transformation and the quantization to decode the prediction residual. Further, the prediction residual encoding and local decoding unit 106 performs motion compensation, if the motion prediction is used, with reference to information indicating whether the motion prediction is used or the intra-picture prediction is used. Sequential decoding processing performed in this case is referred to as "local decoding." The prediction residual encoding and local decoding unit 106 generates a reference image to be used in the inter-picture encoding by performing the local decoding processing. The generated reference image is stored in the main storage unit 110 via the register bus 118. After completing the local decoding processing, the prediction residual encoding and local decoding unit 106 notifies the first encoding control unit 103 of completion of the encoding processing performed on the target macroblock.

The first encoding control unit 103 counts the number of encoded macroblocks. As described below, each time the number of encoded macroblocks reaches a macroblock line length that corresponds to the horizontal image size (120 macroblocks in the present exemplary embodiment), the interrupt controller 111 causes the CPU 101 to issue an interrupt. Then, the number of macroblock lines having been subjected to the encoding processing performed by the first encoding unit 102 is transmitted to the CPU 101 via the register bus 118. The internal operation of the second encoding unit 112 is similar to the internal operation of the first encoding unit 102. Therefore, redundant description thereof will be avoided.

The interrupt controller 111 reads a register value relating to the interrupt having been set beforehand in each of the first encoding control unit 103 and the second encoding control unit 113 in response to each interrupt output from the first encoding control unit 103 and the second encoding control unit 113. Then, the interrupt controller 111 adaptively transmits the read register value to the CPU 101. The register value relating to the interrupt is usable for the interrupt controller 111 to determine whether to mask the interrupt or set a priority level for each interrupt. A register reading/writing request, if it is issued from the CPU 101, is transmitted to the interrupt controller 111, the first encoding control unit 103, and the second encoding control unit 113 as a register access via the register bus 118.

As mentioned above, each of the first encoding unit 102 and the second encoding unit 112 performs motion vector search processing based on the predetermined motion vector search algorithm. According to the motion vector search algorithm, maximum values of the motion vector in the horizontal direction and the vertical direction are determined beforehand. It is general that a motion vector presence range (i.e., a range in which the motion vector is possibly present) is already known. In the motion vector search algorithm according to the present exemplary embodiment, the motion vector presence range is already known. The CPU 101 reads a predetermined register value relating to the motion vector via the register bus 118. The CPU 101 can confirm the motion vector presence range in each of the first encoding unit 102 and the second encoding unit 112 based on the read register value, before starting the encoding processing.

The encoding processing to be performed by the first encoding control unit 103 and the second encoding control unit 113 and information transmitted to or received from the CPU 101 are described in detail below with reference to a timing chart illustrated in FIG. 4.

Figure 4:
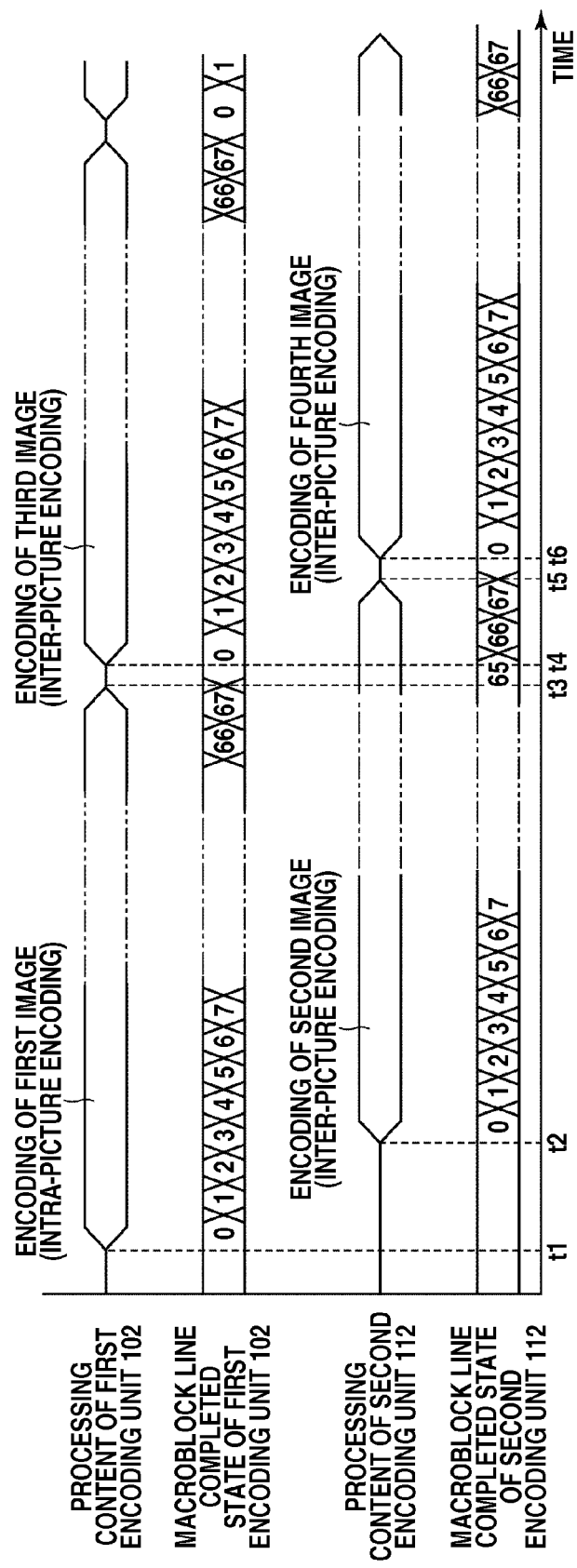
FIG. 4 is a timing chart illustrating encoding processing according to the first exemplary embodiment.

In FIG. 4, the value in the horizontal direction refers to time. FIG. 4 illustrates processing content (including a frame being currently encoded) in the first encoding unit 102 and the second encoding unit 112 and a state of each encoded macroblock line. In FIG. 4, the number of encoding processing completed macroblock lines is equal to the vertical coordinate position of the macroblock being currently encoded. For example, in a case where the currently encoded macroblock is in the state illustrated in FIG. 3, the encoding processing is already completed for two upper macroblock lines. In the present exemplary embodiment, a vertical motion vector presence range determined based on the motion vector search algorithm is −32 pixels to 31 pixels (corresponding to five macroblocks).

At time t1, the first encoding unit 102 starts intra-picture encoding processing on the first image in response to an operation start instruction from the CPU 101. On the other hand, the second encoding unit 112 cannot start inter-picture encoding processing to encode the second image at time t1, because a reference image to be used in the motion search is not yet generated.

Each time the first encoding control unit 103 completes the encoding processing for the rightmost macroblock of the image, the first encoding control unit 103 reflects the number of encoded macroblock lines to the register provided in the first encoding control unit 103, and sends an interrupt notification to the CPU 101 via the interrupt controller 111.

If the CPU 101 receives the interrupt notification, the CPU 101 reads the number of encoded macroblock lines from the first encoding control unit 103 via the register bus 118. Then, the CPU 101 clears the interrupt by setting a register value relating to the interrupt clear in the first encoding control unit 103.

When the motion vector presence range is −32 pixels to 31 pixels, there is a possibility that 0 pixel to 47 pixels of the first image in the vertical direction may be referred to by each macroblock (16×16 pixels) of the first macroblock line of the second image in the inter-picture prediction. The first encoding unit 102 completes the encoding of the vertical 0 to 47 pixels (corresponding to three macroblock lines), which is the motion vector presence range. At this moment, in the second encoding unit 112, it can be assured that the reference image used by the macroblock of the first macroblock line is currently available. In response to each interrupt notification, the CPU 101 reads the number of encoded macroblock lines from the first encoding control unit 103 and determines whether the reference image is currently available for the second encoding unit 112. At time t2, the first encoding unit 102 completes the encoding processing for three macroblock lines. Therefore, the CPU 101 instructs the second encoding unit 112 to start inter-picture encoding processing to encode the first macroblock line (i.e., initial processing target block) of the second image.

The processing speed of the first encoding unit 102 is generally different from the processing speed of the second encoding unit 112. Therefore, in the inter-picture encoding, it is necessary to confirm whether the reference image is available for each macroblock line. Therefore, upon completing the processing of each macroblock line, the second encoding unit 112 reflects the number of encoded macroblock lines to the register provided in the second encoding control unit 113. Then, the second encoding unit 112 sends an interrupt notification to the CPU 101 and interrupts the encoding processing.

The CPU 101 determines whether the reference image is available when the second encoding unit 112 performs inter-picture encoding processing on each macroblock line, with reference to the number of encoded macroblock lines acquired from the first encoding unit 102. For example, to enable the second encoding unit 112 to start encoding the second macroblock line, it is necessary that the number of macroblock lines encoded by the first encoding unit 102 is not smaller than 4. If it is determined that the reference image is available, the CPU 101 instructs the second encoding unit 112 to resume the encoding processing. If it is determined that the reference image is not available, the CPU 101 does not instruct the second encoding unit 112 to resume the encoding processing.

The CPU 101 repeats the above-mentioned processing for all macroblock lines included in the image. At time t3, the first encoding unit 102 completes the encoding processing for the first image. At time t5, the second encoding unit 112 completes the encoding processing for the second image.

The CPU 101 compares the motion vector presence range of the first encoding unit 102 with the number of macroblock lines whose encoding processing has been completed by the second encoding unit 112, to enable the first encoding unit 102 to perform inter-picture prediction processing to encode the third image. The motion vector presence range of the first encoding unit 102 can be determined based on the motion vector search algorithm. Further, in the present exemplary embodiment, the vertical size of the image is sufficiently large compared to the vertical size of the motion vector presence range. Therefore, the necessary reference image area is available, except when the second encoding unit 112 performs the encoding processing at an extremely low speed. If it is confirmed that the necessary reference image area is available, then at time t4, the CPU 101 instructs the first encoding unit 102 to start inter-picture encoding processing to encode the third image.

The CPU 101 determines whether the reference image is available for each of the third and fourth images before processing the macroblock lines. The CPU 101 determines processing start timing to cause the first encoding unit 102 and the second encoding unit 112 to start their encoding operations.

As mentioned above, the CPU 101 adjusts the processing start timing for each of the first and second encoding units, based on the motion vector presence range determined beforehand according to the motion vector search algorithm. Thus, the first encoding unit 102 and the second encoding unit 112 can perform parallel encoding processing on consecutive frames in the inter-picture encoding. The overall performance of the first encoding unit 102 and the second encoding unit 112 can be improved in processing speed. Further, performing the encoding processing while maintaining high encoding efficiency is feasible.

The motion vector according to a standard encoding method (e.g., H.264) is generally usable in motion compensation with non-integer-pel precision. Generation of a non-integer-pel employs filter processing. Therefore, when a motion vector is used in the motion compensation with non-integer-pel precision, the range of a reference image used to perform motion vector search processing for a macroblock is 2 to 3 pixels greater in both of the horizontal and vertical directions, compared to the maximum motion vector value. Therefore, to eliminate the dependency between images in the motion prediction, it is necessary to wait for a while before starting and resuming the encoding processing by an amount comparable to a sum of the number of macroblock lines including the motion vector presence range and one additional macroblock line. Therefore, in the timing chart illustrated in FIG. 4, if using the non-integer-pel precision motion vector is essential, the CPU 101 instructs the second encoding unit 112 to start encoding processing for the second image after the first encoding unit 102 completes the encoding of four macroblock lines.

In the present exemplary embodiment, the first encoding control unit 103 and the second encoding control unit 113 send an interrupt notification to the CPU 101 each time the processing of each macroblock line has been completed. However, the present disclosure is not limited to the above-mentioned method. To start the parallel encoding processing at early timing, it is useful to confirm whether the reference image is currently available every time the encoding processing of one macroblock has been completed and start the encoding processing. In this case, it is necessary to take the motion vector presence range into consideration not only in the vertical direction but also in the horizontal direction. However, the number of times of interrupt generation greatly increases because the interrupt is issued to the CPU 101 every time the encoding processing of one macroblock has been completed.

On the other hand, to reduce the number of times of interrupt generation for the CPU 101, it is useful to issue an interrupt to the CPU 101 every time the encoding processing has been completed for a predetermined number of a plurality of macro block lines and determine whether the encoding processing can be started. In this case, the parallel encoding processing on a plurality of images can be started at slightly early timing.

It is feasible to adjust the number of times of the interrupt issued for the above-mentioned CPU 101 before causing the first encoding control unit 103 and the second encoding control unit 113 to start encoding processing, by performing predetermined register settings relating to the number of times of interrupt issuance.

The image encoding method used in the present disclosure is not limited to H.264. Any other image encoding method that includes the inter-picture prediction is employable. Further, the size of each block (i.e., a unit of encoding) is not limited to 16×16 pixels constituting one macroblock. For example, another usable block size is 32×32 pixels or 64×64 pixels that are defined by HEVC, as discussed in the patent literature 2.

Further, the maximum value of the motion vector in the vertical direction determined based on the motion vector search algorithm is not limited to the above-mentioned example. The maximum value can be set to a larger value (e.g., −512 pixels to 511.75 pixels). The present exemplary embodiment is applicable even when the motion vector of a non-integer-pel takes a maximum value.

Further, the present disclosure is not limited to a specific motion vector search algorithm. The present disclosure is applicable to any other motion vector search algorithms that specifies the motion vector presence range beforehand. Further, the image group structure is not limited to the configuration illustrated in FIG. 3, the present exemplary embodiment is applicable to any combination of the intra-picture encoding and the inter-picture encoding.

An image encoding apparatus according to a second exemplary embodiment uses a level to calculate a motion vector presence range. The level used in the present exemplary embodiment is information indicating the range of a parameter that can be decoded by an image decoding apparatus, which is generally defined in international standards for image encoding (e.g., H.264 and HEVC).

The image encoding apparatus described in the above-mentioned first exemplary embodiment calculates the motion vector presence range based on the motion vector search algorithm. However, if the motion vector search algorithm is not disclosed for the encoding unit, the motion vector presence range may be unclear. An employed algorithm may not be able to fix the motion vector presence range. In this case, the configuration described in the first exemplary embodiment cannot calculate the motion vector presence range.

Therefore, the image encoding apparatus according to the present exemplary embodiment uses a level in calculating a motion vector presence range and performs encoding processing, as described below. The level is information included in the header of an encoded stream. Therefore, the level can be referred to by each of the image encoding apparatus and the image decoding apparatus. Further, according to the international standards for image encoding (e.g., H.264), the maximum value of a motion vector in the vertical direction is generally limited based on the level.

The image encoding apparatus according to the present exemplary embodiment has a configuration that is similar to the configuration described in the first exemplary embodiment with reference to FIG. 1, and therefore redundant description thereof will be avoided. Further, in the present exemplary embodiment, it is presumed that the level is "level 4" illustrated in FIG. 5, according to which the positive maximum value of the motion vector in the vertical direction is 255.75 pixels.

FIG. 5 is a table indicating maximum motion vector values in the vertical direction, in respective levels. Each level illustrated in FIG. 5 defines a maximum size of an image (i.e., the maximum number of macroblocks in an image) that can be decoded by a decoding unit and a maximum motion vector value in the vertical direction. In FIG. 5, the maximum motion vector value in each level is a range defined with a positive value and a negative value. Whether the reference image is available in encoding and decoding is dependent on only the positive maximum value of the motion vector. Therefore, the positive maximum value of the motion vector is used in the present exemplary embodiment.

Figure 6:
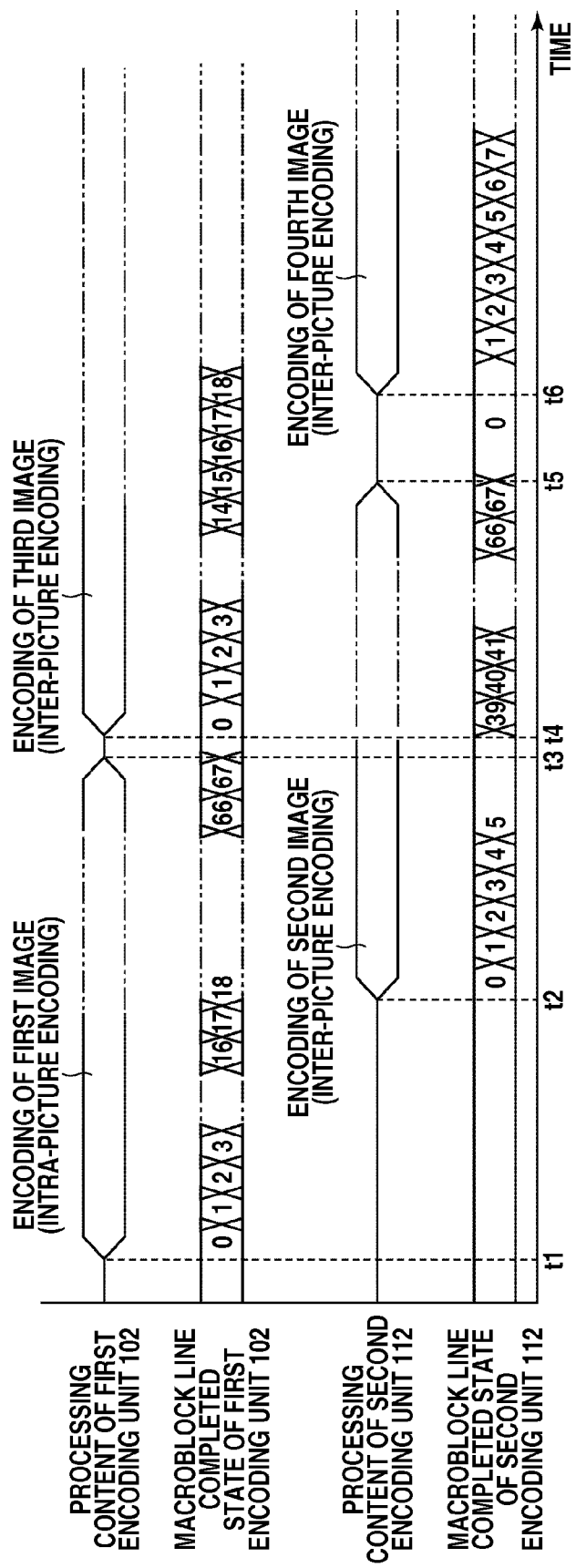
FIG. 6 is a timing chart illustrating encoding processing according to the second exemplary embodiment.

FIG. 6 is a timing chart illustrating an encoding operation that can be performed base on the image group structure and encoding target image allocation illustrated in FIG. 2. The second encoding unit 112 waits for a while and starts its operation when the first encoding unit 102 completes the encoding of 18 macroblock lines that correspond to 255.75 (namely, the positive maximum value of the motion vector in the vertical direction).

Further, immediately after time t5 (namely, when the second encoding unit 112 has completed the encoding processing for the second image), the first encoding unit 102 has not yet completed the encoding processing for the third image (i.e., the reference image for the fourth image). Accordingly, the CPU 101 instructs the second encoding unit 112 to wait for a while and start encoding processing for the fourth image at time t6 (namely, when the number of macroblock lines encoded by the first encoding unit 102 reaches 18).

According to the configuration of the above-mentioned image encoding apparatus, calculating the motion vector presence range using the level is feasible even when the motion vector presence range cannot be calculated based on the motion vector search algorithm. Therefore, in the present exemplary embodiment, the parallel encoding processing on a plurality of images can be realized by a plurality of encoding units using the motion vector presence range. Similar to the above-mentioned first exemplary embodiment, the level, the motion vector presence range, and the block size are not limited to the above-mentioned examples.

In the first exemplary embodiment, information relating to the motion vector search algorithm is not generally included in the encoded stream. Therefore, if an image decoding apparatus is configured to perform decoding processing based on a compressed encoded stream, the image decoding apparatus cannot calculate a motion vector presence range based on a motion vector search algorithm.

Further, the image encoding apparatus according to the second exemplary embodiment uses a level indicating a parameter value range that can be decoded by the image decoding apparatus to calculate a motion vector presence range. In a third exemplary embodiment, an image decoding apparatus is configured to use a level to decode an encoded stream received from an image encoding apparatus that uses a level in encoding as described in the second exemplary embodiment.

Figure 7:
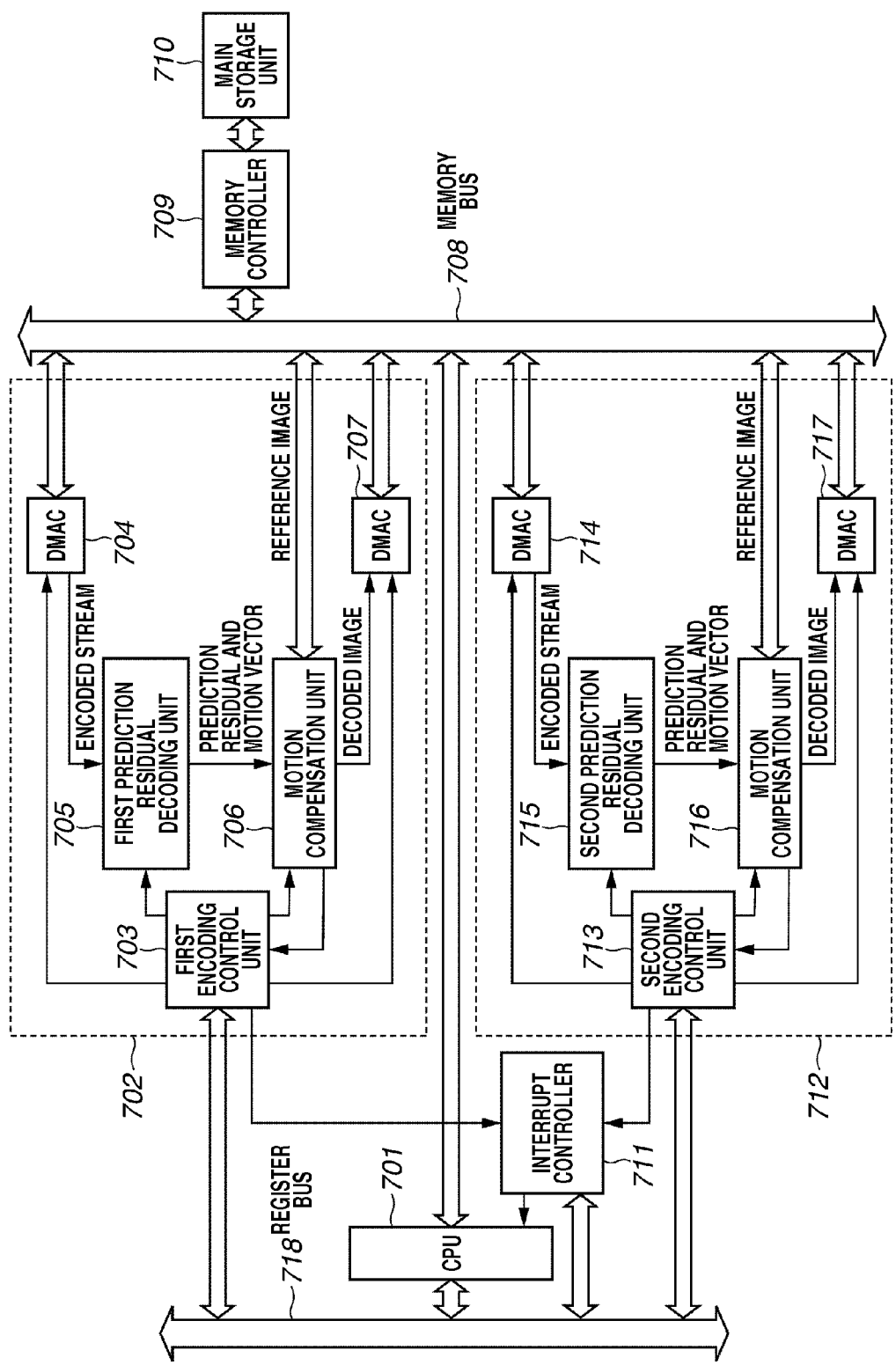
FIG. 7 illustrates an image decoding apparatus according to a third exemplary embodiment.

FIG. 7 illustrates an image decoding apparatus according to the third exemplary embodiment of the present disclosure. The image decoding apparatus illustrated in FIG. 7 includes a CPU 701, a first decoding unit 702, a second decoding unit 712, a memory bus 708, a memory controller 709, a main storage unit 710, an interrupt controller 711, and a register bus 718. The memory bus 708, the memory controller 709, the main storage unit 710, the interrupt controller 711, and the register bus 718 are functionally similar to those described in the first exemplary embodiment with reference to FIG. 1. Therefore, redundant description thereof will be avoided.

The CPU 701 can set a decoding operation start instruction to respective registers of a first decoding control unit 703 and a second decoding control unit 713, via the register bus 718, based on a user operation or an external operation instruction. Further, the CPU 701 can receive the number of decoded macroblock lines from each of the first decoding control unit 703 and the second decoding control unit 713 via the register bus 718.

The first decoding unit 702 includes the first decoding control unit 703, a direct memory access controller (DMAC) 704, a first prediction residual decoding unit 705, a motion compensation unit 706, and a DMAC 707.

The first decoding control unit 703 can control internal processing in response to an operation start command from the CPU 701. The DMAC 704 can read (i.e., input) an encoded stream from the main storage unit 710 and outputs the input encoded stream to the first prediction residual decoding unit 705.

The first prediction residual decoding unit 705 can perform entropy decoding, inverse orthogonal transformation, and inverse quantization processing on a compressed stream, and can decode a prediction residual. The decoded prediction residual is output from the first prediction residual decoding unit 705 to the motion compensation unit 706. A decoded macroblock, if it has been encoded based on the intra-picture prediction, is output to the motion compensation unit 706 after decoding processing thereof completes. Further, the first prediction residual decoding unit 705 can decode a motion vector multiplexed with an encoded stream and can output the decoded motion vector to the motion compensation unit 706.

The motion compensation unit 706 can read a reference image from the main storage unit 710 based on the motion vector received from the first prediction residual decoding unit 705, and can perform motion compensation processing on the prediction residual. A motion compensated decoded image can be output from the motion compensation unit 706 to the DMAC 707 and written in the main storage unit 710.

The motion compensation unit 706 can directly output a decoded macroblock, if it has been encoded based on the intra-picture prediction, to the DMAC 707.

After completing the motion compensation processing, the motion compensation unit 706 notifies the first decoding control unit 703 of completion of the macroblock decoding processing.

The first decoding control unit 703 can count the number of decoded macroblocks. Similar to the first exemplary embodiment, the first decoding control unit 703 sends an interrupt notification to the CPU 701 via the interrupt controller 711, when the decoding of each macroblock line has been completed. The first decoding control unit 703 can transmit the number of motion compensated macroblock lines to the CPU 701 via the register bus 718.

The second decoding unit 712 includes the second decoding control unit 713, a direct memory access controller (DMAC) 714, a second prediction residual decoding unit 715, a motion compensation unit 716, and a DMAC 717. The internal operation of the second decoding unit 712 is similar to that of the first decoding unit 702. Therefore, redundant description thereof will be avoided.

Figure 8:
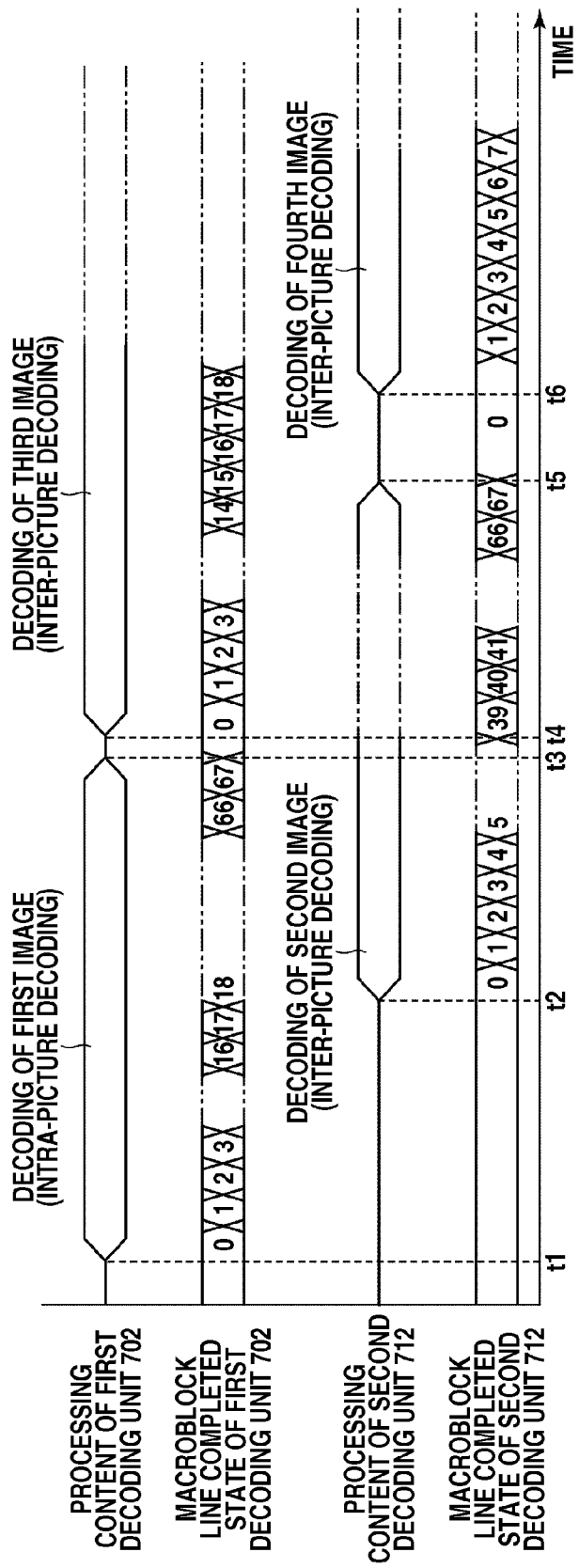
FIG. 8 is a timing chart illustrating decoding processing according to the third exemplary embodiment.

FIG. 8 is a timing chart illustrating parallel decoding processing performed on a plurality of frames using a motion vector presence range, which is determined based on a level in decoding processing performed by the first decoding unit 702 and the second decoding unit 712, in addition to communications to be performed with the CPU 701. In the present exemplary embodiment, it is presumed that the image size of each encoded stream (i.e., a decoding target) is 1920×1088 pixels similar to the example illustrated in FIG. 3 and the level is "level 4" illustrated in FIG. 5, according to which the positive maximum value of the motion vector in the vertical direction is 255.75 pixels. Further, similar to the first exemplary embodiment, it is presumed that the encoding of the encoded stream has been performed based on the image group structure illustrated in FIG. 2. The first decoding unit 702 performs decoding processing on odd-numbered images. The second decoding unit 712 performs decoding processing on even-numbered images.

In the present exemplary embodiment, each encoded stream has a file format that can randomly access compressed data of each image. The DMAC 704 can directly read head data of a decoding target image.

At time t1, in response to an operation start instruction from the CPU 701, the first decoding unit 702 starts intra-picture decoding processing to decode the first image (i.e., the image having been intra-picture encoded) included in the encoded stream. The second decoding unit 712 cannot start decoding processing (inter-picture decoding processing) to decode the inter-picture encoded second image at time t1, because a reference image to be used in the motion compensation is not yet generated. If the first decoding unit 702 completes the decoding processing for the rightmost macroblock line of the image, the first decoding control unit 703 reflects the number of decoded macroblock lines to the register provided therein, and sends an interrupt notification to the CPU 701 via the interrupt controller 711.

If the CPU 701 receives the interrupt notification, the CPU 701 reads the number of decoded macroblock lines from the first decoding control unit 703 via the register bus 718. Then, the CPU 701 clears the interrupt issued from the first decoding control unit 703. As described above, in the present exemplary embodiment, the positive maximum value of the motion vector in the vertical direction is 255.75 pixels, which can be included in 17 macroblock lines. Further, in the present exemplary embodiment, the presence of the non-integer-pel motion vector is essential. To generate a reference pixel to be used in the motion compensation, it is necessary that the decoding of 18 macroblock lines (greater than 17 macroblock lines by one macroblock line) is already completed.

As illustrated in FIG. 8, at time t2, namely when the number of macroblock lines decoded by the first decoding unit 702 has reached 18, the CPU 701 confirms that the reference image is currently available and instructs the second decoding unit 712 to start a decoding operation.

In performing inter-picture decoding processing on the second image, the second decoding unit 712 transmits the number of decoded macroblock lines to the CPU 701 via the register bus 718 every time the decoding of a target macroblock line completes. Further, similar to the first exemplary embodiment, the second decoding unit 712 temporarily interrupts the processing of each macroblock line and resumes the decoding processing after the CPU 701 confirms that a reference image is available in decoding the next macroblock line. For example, to cause the second decoding unit 712 to start decoding the second macroblock line, it is necessary that the number of macroblock lines decoded by the first decoding unit 702 has already reached 19.

The second decoding unit 712 repeats the above-mentioned decoding processing for all macroblock lines included in the image. At time t3, the first decoding unit 702 completes the decoding processing for the first image. At time t5, the second decoding unit 712 completes the decoding processing for the second image. The first decoding unit 702 has not yet completed the decoding processing for the third image (reference image for the fourth image) at time t5. Accordingly, the CPU 701 instructs the second decoding unit 712 to wait for a while and start decoding processing for the fourth image at time t6 (namely, when the number of macroblock lines decoded by the first decoding unit 702 reaches 18).

As mentioned above, the image decoding apparatus according to the present exemplary embodiment identifies a motion vector presence range based on a level included in the header of an encoded stream, and adjusts processing start timing for each of the first and second decoding units. As a result, performing the parallel decoding processing on a plurality of images can be realized by a plurality of decoding units in such a way as to greatly improve the processing speed. Further, the image decoding apparatus according to the present exemplary embodiment can decode an encoded stream without depending on an employed motion vector search algorithm.

The value of each level and the maximum value of the motion vector in the vertical direction are not limited to the above-mentioned numerical values. The configuration according to the present exemplary embodiment is applicable to different values. Further, the image group structure is not limited to the above-mentioned example.

Further, the present exemplary embodiment is employable even when the maximum motion vector value in the vertical direction depends on not only the level but also a profile indicating a processing combination that can be decoded by a decoding unit. Performing the parallel decoding processing on a plurality of images can be realized by calculating a motion vector presence range based on a level and a profile and adjusting processing start timing for each of the first and second decoding units based on the calculated motion vector presence range. Further, in a case where an encoding method according to which the maximum motion vector value in the vertical direction is a fixed value that does not vary depending on the level is employed, the configuration of the present exemplary embodiment is applicable when the above-mentioned fixed value is used as a motion vector presence range.

In the first and second exemplary embodiments, as illustrated in FIG. 2, the image encoding apparatus performs encoding (i.e., inter-picture encoding) based on the image group structure using only one reference image. However, the present disclosure is not limited to the image group structure illustrated in FIG. 2.

FIG. 9 illustrates an image group structure using bidirectional inter-picture encoding for an image encoding apparatus that uses two reference images to perform encoding processing. According to the example illustrated in FIG. 9, the first and 16th images are subjected to the intra-picture encoding. The fourth and seventh images P4 and P7, which are numbered according to the input order, are subjected to inter-picture encoding using only one reference image. The second and third images B2 and B3 are subjected to bidirectional inter-picture encoding using two reference images. The bidirectional inter-picture encoding uses two (temporally past and future) images. Therefore, the input order of an image is different from the encoding order thereof. To change the encoding order, it is necessary for the main storage unit 110 to store a plurality of input images. In FIG. 9, each number in parentheses indicates the encoding order.

Further, in a bidirectional inter-picture prediction according to a fourth exemplary embodiment, any one of an intra-picture encoded image, an inter-picture encoded image, and a bidirectional inter-picture encoded image is usable as a reference image. For example, the image B2 and the image P4 are two reference images for the image B3 illustrated in FIG. 9.

In the image group structure illustrated in FIG. 9, the first encoding unit 102 performs encoding processing on images that are odd-numbered in the encoding order. The second encoding unit 112 performs encoding processing on images that are even-numbered in the encoding order. The timing chart illustrated in FIG. 6 is applicable in this case. However, the encoding processing to be applied to the third and fourth images is the bidirectional inter-picture encoding (not the inter-picture encoding). In the present exemplary embodiment, it is presumed that the level is the "level 4" illustrated in FIG. 5, according to which the positive maximum value of the motion vector in the vertical direction is 255.75 pixels. Hereinafter, the image encoding apparatus according to the present exemplary embodiment is described in detail below with reference to FIG. 1.

At time t1, the CPU 101 instructs the first encoding unit 102 to start an intra-picture encoding operation for the image I1. Further, the CPU 101 instructs the second encoding unit 112 to start an inter-picture encoding operation for the image P4 at time t2 when the first encoding unit 102 has completed the encoding processing for 18 macroblock lines.

At time t3, the first encoding unit 102 completes the encoding processing for the image I1. Then, the CPU 101 confirms whether the second encoding unit 112 has encoded at least 18 macroblock lines of the image P4. After completing the confirmation, at time t4, the CPU 101 instructs the first encoding unit 102 to start a bidirectional inter-picture encoding operation for the image B2. In the present exemplary embodiment, the image I1 and the image P4 are two reference images for the image B2. However, at this moment, it is apparent that the encoding of the image I1 is already completed. Therefore, the CPU 101 does not confirm the processing state of the image I1. However, in a case where the number of encoding units provided in the image encoding apparatus is equal to or greater than two, it is necessary to confirm the number of encoded macroblock lines for the image I1.

After the encoding of the image P4 is completed at time t5, the CPU 101 confirms the number of macroblock lines of the image B2 having been encoded by the first encoding unit 102. After the first encoding unit 102 has completed the encoding of at least 18 macroblock lines for the image B2 and if it is confirmed that the reference image is available, the CPU 101 instructs the second encoding unit 112 to start a bidirectional inter-picture encoding operation for the image B3. In this case, it is apparent that the encoding processing for the image P4 (i.e., the other reference image) is already completed. Therefore, the CPU 101 does not confirm the processing state of the image P4. However, in a case where the number of encoding units provided in the image encoding apparatus is equal to or greater than two, it is necessary to confirm the number of encoded macroblock lines for the image P4.

As mentioned above, the present exemplary embodiment is easily applicable to an image encoding apparatus that performs encoding processing on an image group configuration including the bidirectional inter-picture encoding. In other words, the apparatus according to the present exemplary embodiment can perform parallel encoding processing on a plurality of images.

Further, the present exemplary embodiment is applicable to an image decoding apparatus that includes a plurality of decoding units, each using two reference images to perform bidirectional inter-picture decoding processing, and performs parallel decoding processing on a plurality of images.

In a fifth exemplary embodiment, an image encoding apparatus is configured to include a plurality of encoding units that performs parallel encoding processing using slices or tiles, each serving as a motion vector presence range, in the image encoding processing.

Figure 10A:
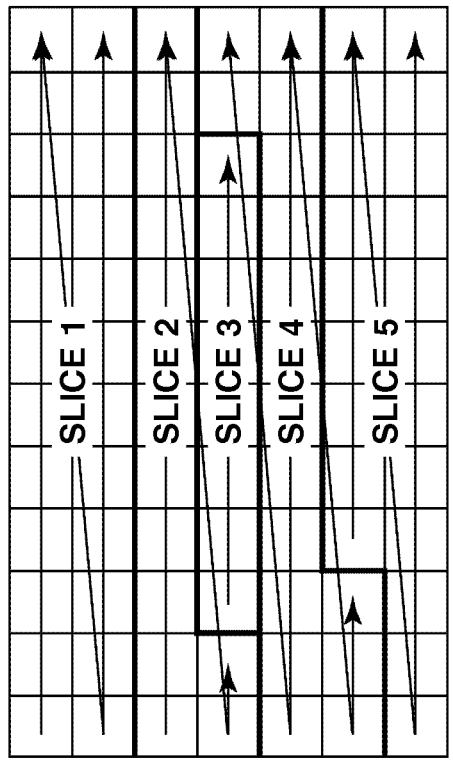
FIG. 10A illustrates an example of a plurality of slices.
Figure 10B:
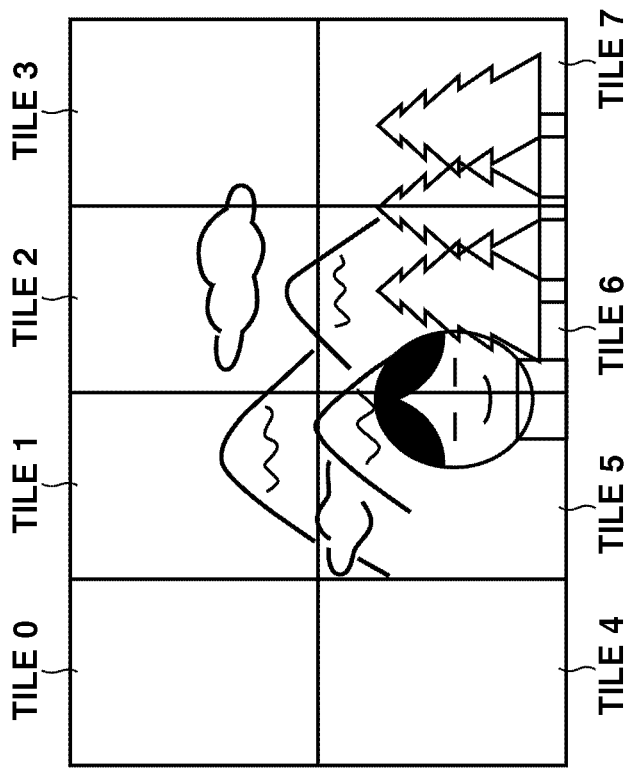
FIG. 10B illustrates an example of a plurality of tiles according to a fifth exemplary embodiment.

One of the techniques employed in H.264 is generally referred to as "slice", in which an image is divided into a plurality of areas for each macroblock according to the raster/scanning order and each area is encoded or decoded independently. One of the techniques employed in HEVC is generally referred to as "tile", in which an image is divided into a plurality of rectangular areas and each area is independently encoded or decoded. FIG. 10A illustrates an example of a plurality of slices. FIG. 10B illustrates an example of a plurality of tiles.

In the motion vector search according to the present exemplary embodiment, the boundary of each slice or tile defines a motion vector presence range. Further, the vertical size of each slice or tile can be calculated with reference to header information of an encoded stream. Therefore, in both an encoding unit and a decoding unit, the vertical size of each slice or tile is regarded as known information.

The present exemplary embodiment is described below based on the image encoding apparatus illustrated in FIG. 1. The CPU 101 calculates a vertical size of a slice to be used in each of the first encoding unit 102 and the second encoding unit 112 before starting their encoding processing in response to a start address of each slice that can be set externally.

After instructing the first encoding unit 102 to start the intra-picture encoding operation, the CPU 101 confirms the number of encoded macroblock lines transmitted from the first encoding unit 102 via the interrupt controller 111. If the number of macroblock lines encoded by the first encoding unit 102 exceeds the vertical size of the slice to be used in the encoding performed by the second encoding unit 112, it means that the reference image is available. After confirming that the reference image becomes available, the CPU 101 instructs the second encoding unit 112 to start inter-picture encoding.

Further, in a case where the "tile" technique is employed to divide an image, performing parallel encoding processing on a plurality of images can be realized with a configuration similar to that for the above-mentioned "slice" technique. The CPU 101 sets a tile size or a tile division number, which can be obtained externally, before starting the encoding processing. The CPU 101 compares the number of macroblock lines encoded by each of the first encoding unit 102 and the second encoding unit 112 with the vertical size of the tile. Then, the CPU 101 determines the processing start timing to instruct each encoding unit to start its operation with reference to a comparison result.

As mentioned above, in realizing the parallel encoding processing to be performed on a plurality of images, the apparatus according to the present exemplary embodiment can calculate a motion vector presence range with reference to the vertical size of each slice or tile, which can be calculated based on information included in the header of an encoded stream. The present exemplary embodiment is preferably applicable to an image encoding apparatus that performs parallel encoding processing on a plurality of images with encoding units even when the motion search algorithm is unclear or the motion vector presence range is not fixed.

Further, the present exemplary embodiment is applicable to an image decoding apparatus that uses a plurality of decoding units to perform parallel decoding processing on a plurality of images.

In the present disclosure, the number of encoding units provided in an image encoding apparatus is not limited to a specific value. In other words, it is feasible to use M (M is an arbitrary positive integer that is equal to or greater than 2) encoding units. The image encoding apparatus according to the present exemplary embodiment includes four encoding units (M=4) that are directly connected to communicate with each other.

FIG. 11 illustrates an image encoding apparatus according to a sixth exemplary embodiment. The image encoding apparatus illustrated in FIG. 11 includes a CPU 1101, a memory bus 1106, a memory controller 1107, a main storage unit 1108, an interrupt controller 1109, and a register bus 1110, which are similar to corresponding components illustrated in FIG. 1 and perform operations that are similar to those described in the first exemplary embodiment, although redundant description thereof will be avoided. Each of a first encoding unit 1102, a second encoding unit 1103, a third encoding unit 1104, and a fourth encoding unit 1105 has an internal configuration that is similar to that of the encoding unit illustrated in FIG. 1, although only the encoding control unit is illustrated in FIG. 11.

In a case where a plurality of encoding units is present as described in the present exemplary embodiment, each of the first to fourth encoding units 1102 to 1105 sends an interrupt notification to the CPU 1101 upon completing the encoding of a macroblock line. The number of interrupt notifications received by the CPU 1101 increases in proportion to the number of the encoding units. If the CPU 101 receives a plurality of interrupt notifications, an operation start instruction to be generated from the CPU 1101 for each of the first to fourth encoding units 1102 to 1105 may be delayed. The overall performance in processing of the image encoding apparatus may deteriorate correspondingly. In this respect, the image encoding apparatus according to the present exemplary embodiment can prevent the number of interrupt notifications sent to the CPU 1101 from increasing even when the number of encoding units increases.

The image encoding apparatus according to the present exemplary embodiment performs encoding processing with the image group structure illustrated in FIG. 2. More specifically, the image encoding apparatus performs encoding processing on each image according to the following allocation (N is an arbitrary positive integer).

The first encoding unit 1102 performs encoding processing on first, fifth, ninth, . . . , and (4N−3)th images. The second encoding unit 1103 performs encoding processing on second, sixth, tenth, . . . , and (4N−2)th images. The third encoding unit 1104 performs encoding processing on third, seventh, eleventh, . . . , and (4N−1)th images. The fourth encoding unit 1105 performs encoding processing on fourth, eighth, twelfth, . . . , and (4N)th images. In the present exemplary embodiment, when M encoding units are provided to encode a plurality of images, each of the first to fourth encoding units outputs a signal indicating the number of encoded macroblock lines. When "i" is an integer that is not smaller than 1 and not greater than M, the output signal indicating the encoded macroblock lines is directly sent to an encoding unit (or a plurality of encoding units) that performs motion prediction using an image generated by the i-th encoding unit through the local decoding as a reference image.

For example, in a case where the image group structure illustrated in FIG. 2 is employed in performing encoding, a reference image to be used in motion prediction performed by the second encoding unit 1103 illustrated in FIG. 11 is generated through the local decoding performed by the first encoding unit 1102. Therefore, in FIG. 11, an output signal indicating the number of macroblock lines encoded by the first encoding unit 1102 is directly sent to the second encoding unit 1103. Similarly, an output signal indicating the number of macroblock lines encoded by the fourth encoding unit 1105 illustrated in FIG. 11 is directly sent to the first encoding unit 1102. Therefore, when the image group structure illustrated in FIG. 2 is employed in performing encoding, the signal indicating the number of encoded macroblock lines is sent from one encoding unit to another encoding unit in a ring shape as illustrated in FIG. 11.

An operation that can be performed by the image encoding apparatus according to the present exemplary embodiment is described below with reference to a timing chart illustrated in FIG. 12. It is presumed that the motion vector presence range based on the motion search algorithm in each of the first to fourth encoding units 1102 to 1105 according to the present exemplary embodiment is −32 pixels to 31.75 pixels. Further, it is presumed that the first encoding control unit 1112, the second encoding control unit 1113, the third encoding control unit 1114, and the fourth encoding control unit 1115 calculate the motion vector presence range in each of the first to fourth encoding units 1102 to 1105 before starting respective encoding processing.

Figure 12:
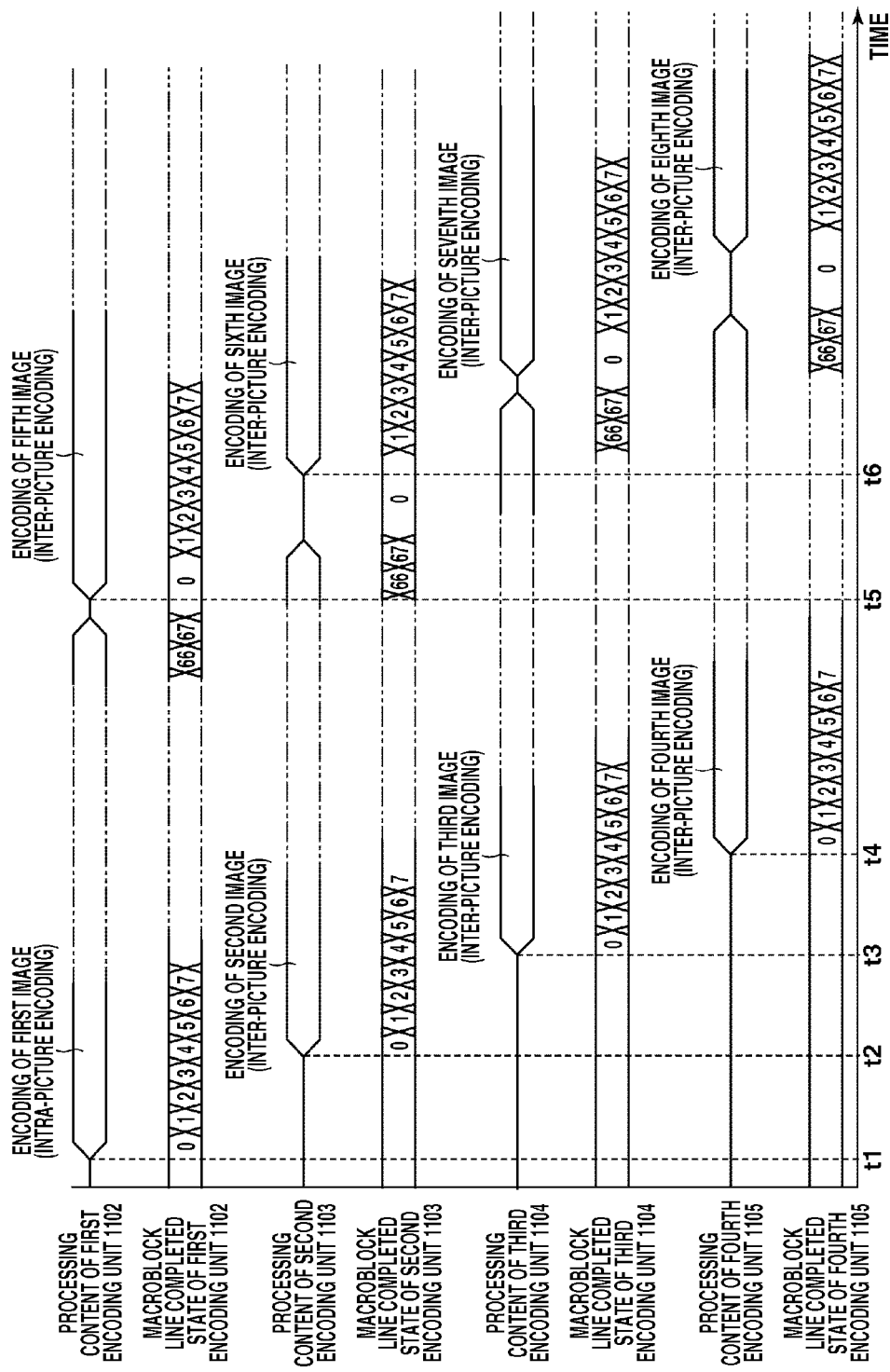
FIG. 12 is a timing chart illustrating encoding processing according to the sixth exemplary embodiment.

At time t1 illustrated in FIG. 12, the first encoding control unit 1112 provided in the first encoding unit 1102 starts intra-picture encoding to encode the first image in response to an operation start instruction from the CPU 101.

To perform inter-picture encoding, each of the second to fourth encoding control units 1113 to 1115 provided in the second encoding unit 1103, the third encoding unit 1104, and the fourth encoding unit 1105 polls (i.e., repetitively reads) the signal indicating the number of encoded macroblock lines. In the present exemplary embodiment, the signal indicating the number of encoded macroblock lines is a signal received from the encoding unit that generates the reference image. As described above, the positive maximum value of the motion vector is 31.75 pixels. The motion vector presence range including 31.75 pixels is comparable to three macroblock lines. Further, when it is taken into consideration that 32 or more reference pixels are used in generation of a non-integer-pel of a non-integer-pel motion vector, each of the first to fourth encoding control units 1112 to 1115 waits for a while until the encoding processing completes for four macroblock lines (reference pixel generation). Therefore, it can be assured that the reference image is available.

The second to fourth encoding control units 1113 to 1115 provided in the second encoding unit 1103, the third encoding unit 1104, and the fourth encoding unit 1105 wait until time t2, time t3, and time t4 illustrated in FIG. 12, respectively, so that the number of macroblock lines received from the encoding unit that generates the reference image reaches 4. Then, the second to fourth encoding control units 1113 to 1115 start encoding processing, respectively.

Further, each of the first to fourth encoding control units 1112 to 1115 provided in the first to fourth encoding units 1102 to 1105 counts the number of encoded macroblocks, and interrupts the encoding processing when the processing has been completed for one macroblock line. The first to fourth encoding control units 1112 to 1115 successively determine whether a reference image is available for a macroblock to be next encoded after interrupting the encoding processing, with reference to an input signal indicating the number of encoded macroblock lines. Then, if it is determined that the reference image is available for the macroblock to be next encoded, each of the first to fourth encoding control units 1112 to 1115 resumes encoding processing for a subsequent macroblock line. For example, in FIG. 12, to perform encoding for the second macroblock line, it is necessary that the number of macroblock lines encoded by an encoding unit that generates a reference image has reached 5. Further, the first encoding unit 1102 starts encoding processing (more specifically, inter-picture prediction on the fifth image) at time t5 after confirming that the number of macroblock lines encoded by the fourth encoding unit 1105 has reached 4, similar to each of other encoding units 1103 to 1105.

Each of the first to fourth encoding control units 1112 to 1115 provided in each of the first to fourth encoding units 1102 to 1105 repeats the above-mentioned processing for all macroblock lines included in the image.

Further, if the encoding processing completes for all macroblock lines of each image, the fourth encoding unit 1105 sends an interrupt notification to the CPU 1101 via the interrupt controller 1109. In short, the image encoding apparatus generates an interrupt notification to be sent to the CPU 1101 upon completing the encoding processing for four images, as a whole. Thus, it is feasible to notify the CPU 1101 of the progress in encoding without increasing the number of interrupt notifications sent to the CPU 1101.

As mentioned above, an image encoding apparatus including M encoding units can realize parallel encoding processing to be performed on M pieces of image data by determining processing start timing based on a motion vector presence range. The image encoding apparatus can improve performances especially in processing speed. In the present exemplary embodiment, using a temporally neighboring image as a reference image is effective in performing the parallel processing while maintaining high encoding efficiency.

Further, the present exemplary embodiment is not limited to the above-mentioned direct signal transmission. For example, the parallel encoding processing can be realized by transmitting the number of encoded macroblock lines via the register bus 1110. In a case where the register bus 1110 is usable to realize the configuration of the present exemplary embodiment, it is necessary for each of the first to fourth encoding units 1102 to 1105 to include a master interface for the register bus 1110. For example, an existing slave interface illustrated in FIG. 11 is feasible.

In the present exemplary embodiment, the number of encoding units is not limited to the above-mentioned numerical value. An arbitrary number of encoding units are usable. If the number of encoding units is 2, the above-mentioned signal indicating the number of encoded macroblock lines is bidirectionally transmitted between two encoding units.

Further, the image encoding apparatus according to the present exemplary embodiment is not limited to the inter-picture prediction and can use the image group structure illustrated in FIG. 9 that uses bidirectional inter-picture encoding. In the bidirectional inter-picture encoding, each encoding unit uses two reference images. If the number of encoding units is three or more, two reference images can be generated in parallel by two different encoding units. It is necessary for each encoding unit to confirm the number of encoded macroblock lines for both of two reference images. To this end, each encoding unit has two signal lines each inputting the number of macroblock lines.

The encoding control unit of each encoding unit starts bidirectional inter-picture encoding after confirming that both of the numerical values received via two signal lines have exceeded the motion vector presence range. In starting the processing for encoding each macroblock line included in an image, it is necessary to confirm the number of macroblock lines successively (two times).

The present disclosure is not limited to the above-mentioned exemplary embodiment. The method for using a direct connection of a signal line indicating the number of macroblock lines is applicable to the image decoding apparatus described in the second exemplary embodiment. Further, the present exemplary embodiment is applicable to the method using encoding and a level in calculating the motion vector presence range, as described in the second to fourth exemplary embodiments, and is applicable to the configuration of the operation start timing of each encoding unit based on a slice or tile size, as described in the fifth exemplary embodiment.

Further, in the inter-picture encoding of H.264, a motion vector in each macroblock of the same image can use different images as reference images. As described above, in a case where a plurality of images is used as reference images in the inter-picture encoding, it is necessary to connect a plurality of signal lines, which correspond to the number of the reference images, to the image encoding unit so that a signal indicating the number of encoded macroblocks corresponding to each reference image can be input to the encoding unit.

Further, in the present exemplary embodiment, the number of encoded macroblock lines is transmitted to different encoding units. However, for example, it is useful for each encoding unit to set the motion vector presence range of another encoding unit beforehand because each encoding unit can cause the different encoding unit to start its processing. In this case, a signal to be transmitted between encoding units is an operation start signal (not a signal indicating the number of macroblock lines). Further, an operation start instruction can be transmitted via the register bus 1110.

A technique employed in HEVC to perform prediction encoding on a motion vector is an adaptive motion vector prediction. The adaptive motion vector prediction technique is characterized by designating a motion vector used in a temporally different image and a motion vector used in the same image as a reference motion vector candidate group. In the present exemplary embodiment, the motion vectors of temporally different images are directly transmitted via an interface directly connecting encoding units, so that both the adaptive motion vector prediction and the parallel encoding of a plurality of images can be realized simultaneously. The encoding according to the present exemplary embodiment is performed for each encoded block of HEVC. The size of each encoded block is any one of 16×16 pixels, 32×32 pixels, and 64×64 pixels. In the following description, an encoded block corresponds to the macroblock described in the first to sixth exemplary embodiments. Further, an encoded block line corresponds to the macroblock line described in the first to sixth exemplary embodiments.

Figure 13:
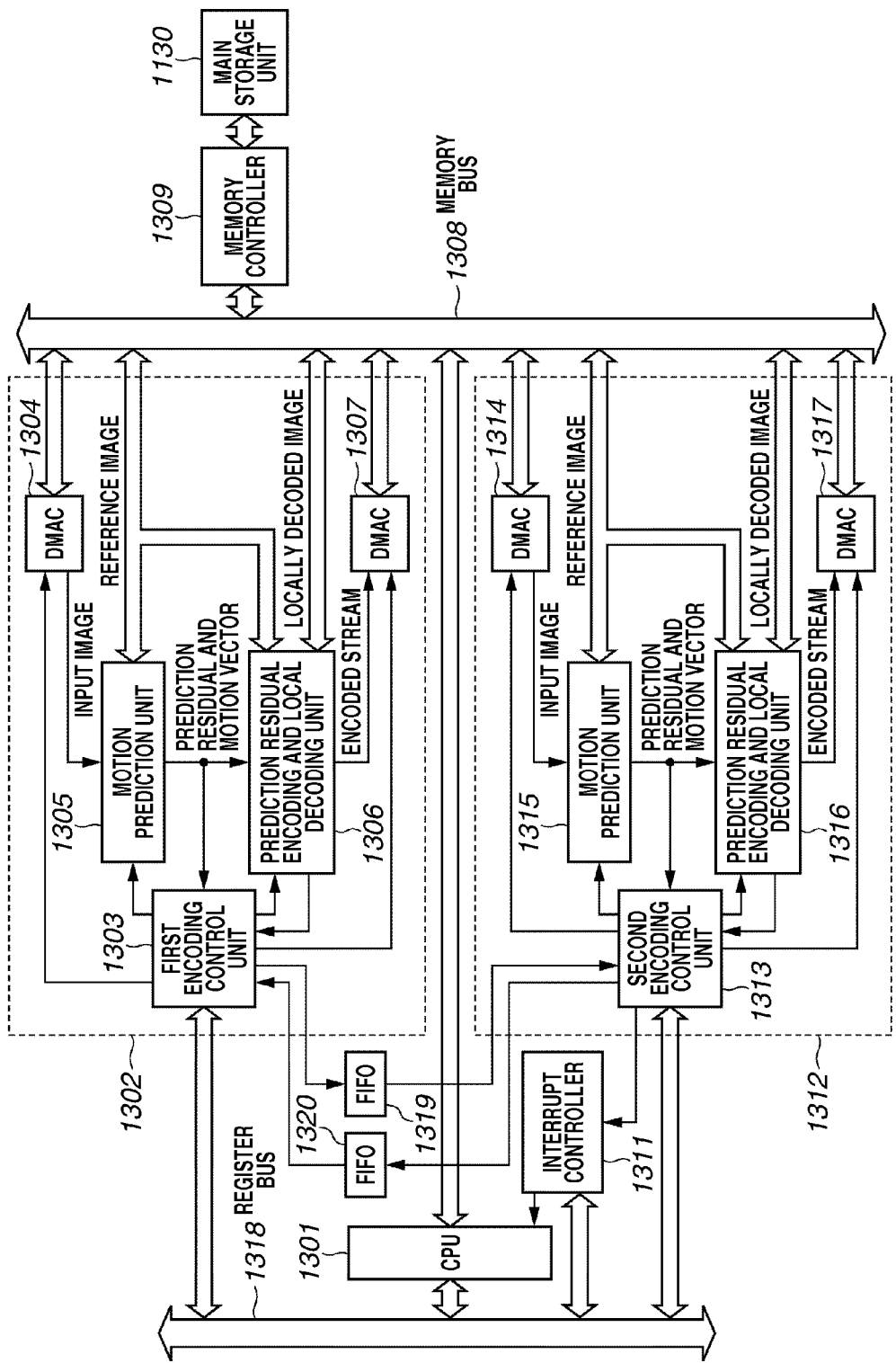
FIG. 13 illustrates an image encoding apparatus according to a seventh exemplary embodiment.

FIG. 13 illustrates an image encoding apparatus according to the present exemplary embodiment. A first encoding unit 1302 is similar to the first encoding unit 102 described in the first exemplary embodiment, except for operations to be performed by a first encoding control unit 1303 and a first motion prediction unit 1305. A second encoding unit 1312 is similar to the second encoding unit 112 described in the first exemplary embodiment, except for operations to be performed by a second encoding control unit 1313 and a second motion prediction unit 1315. Therefore, redundant description thereof will be avoided. Further, as illustrated in FIG. 13, the first encoding control unit 1303 and the second encoding control unit 1313 are mutually connected via a direct connection interface including a first FIFO (First In, First Out) 1319 and a second FIFO 1320 that can store motion vectors.

In the first encoding unit 1302 according to the present exemplary embodiment, the first motion prediction unit 1305 outputs a searched motion vector to a first prediction residual encoding and local decoding unit 1306 and to the first encoding control unit 1303. The first encoding control unit 1303 confirms that the first prediction residual encoding and local decoding unit 1306 has completed the processing of the target encoded block. Then, the first encoding control unit 1303 outputs the motion vector received from the first motion prediction unit 1305 to the first FIFO 1319. However, in a case where the encoding performed by the first encoding unit 1302 is the intra-picture encoding, the first encoding control unit 1303 outputs a data indicating invalidity of the motion vector to the first FIFO 1319. Further, in HEVC, it is feasible to use the size of a different encoded block in the same image. Therefore, the first encoding control unit 1303 adds encoded block size information to the motion vector, and outputs the added result to the first FIFO 1319.

In performing the inter-picture encoding, the second encoding control unit 1313 of the second encoding unit 1312 receives the motion vector searched by the first encoding unit 1302 together with the encoded block size via the first FIFO 1319. The second encoding control unit 1313 can recognize the number of block lines encoded by the first encoding unit 1302 based on the number of times of motion vector reception and the encoded block size. The second encoding control unit 1313 compares the number of encoded block lines with the motion vector presence range of the second encoding unit 1312. In this case, the motion vector presence range is expressed as a converted value indicating the number of encoded block lines determined based on the level. Similar to the above-mentioned first to sixth exemplary embodiments, based on a comparison result, the second encoding control unit 1313 determines whether the reference image is available and then determines encoding processing start timing for each block line to be encoded in the inter-picture encoding.

Further, the second encoding control unit 1313 outputs the motion vector received from the first FIFO 1319, as a reference motion vector candidate, to a second prediction residual encoding and local decoding unit 1316.

The second prediction residual encoding and local decoding unit 1316 performs prediction encoding processing on the motion vector received from the second motion prediction unit 1315. In performing the prediction encoding processing on the motion vector, the second prediction residual encoding and local decoding unit 1316 designates a motion vector of a neighboring block in the same image and the motion vector received from the second encoding control unit 1313 as a reference motion vector candidate group. The second prediction residual encoding and local decoding unit 1316 determines a reference motion vector, which is selectable from the reference motion vector candidate group, as a motion vector that is smallest in the amount of coding when the motion vector is subjected to the prediction encoding. The second prediction residual encoding and local decoding unit 1316 performs prediction encoding using the reference motion vector, and multiplexes the prediction encoded motion vector with an encoded stream.

If a motion vector received from the second encoding control unit 1313 is invalid data, the second prediction residual encoding and local decoding unit 1316 excludes the invalid motion vector from the reference motion vector candidate group.

After starting the encoding processing, the second encoding control unit 1313 outputs the motion vector searched by the second motion prediction unit 1315 and the encoded block size to the second FIFO 1320. The second FIFO 1320 transmits the received data to the first encoding control unit 1303. The first encoding control unit 1303 can confirm the number of block lines encoded by the second encoding unit 1312 based on the number of times of motion vector reception and the encoded block size received via the second FIFO 1320. The first encoding control unit 1303 compares the number of encoded block lines with the motion vector presence range (which is expressed as a converted value indicating the number of encoded block lines). Based on a comparison result, the first encoding control unit 1303 determines whether the reference image is available. Then, the first encoding control unit 1303 determines processing start timing for each block line to be encoded in the inter-picture encoding.

As mentioned above, in the present exemplary embodiment, a motion vector used in the encoding of a temporally different image is directly transmitted between encoding units directly connected via an interface that includes the FIFO. The motion vector can be used in determining processing start timing for each of a plurality of encoding units and in performing prediction encoding processing on a motion vector. As a result, it is feasible to prevent information from being transmitted redundantly. The processing performance in the parallel encoding processing performed on a plurality of images can be improved sufficiently. Further, directly transmitting a motion vector between encoding units via a directly connected interface brings an effect of reducing the usage band of the main storage unit.

HEVC is similar to H.264 in that a plurality of motion vectors can be defined for each encoded block. In this case, it is feasible to count a weighted number of times of motion vector reception based on the number of motion vectors per block. For example, if only one motion vector is present in an encoded block, the count value is equal to 1. If four motion vectors are present, the count value is equal to 0.25. In this manner, it is feasible to confirm the progress in encoding processing, similar to the above-mentioned example.

Further, in the present exemplary embodiment, the first encoding control unit 1303 and the second encoding control unit 1313 can send motion vectors received from the first FIFO 1319 and the second FIFO 1320 to the first motion prediction unit 1305 and the second motion prediction unit 1315. Thus, the first motion prediction unit 1305 and the second motion prediction unit 1315 can perform motion vector search processing considering the amount of coding to be generated in prediction encoding for the motion vector.

The present exemplary embodiment is not limited the above-mentioned image encoding apparatus. A similar system configuration is applicable to an image decoding apparatus. For example, in a case where an image decoding apparatus has the configuration illustrated in FIG. 7, the first decoding control unit 703 provided in the first decoding unit 702 is directly connected to the second decoding control unit 713 provided in the second decoding unit 712 via the interface including the FIFO. Thus, even in an image decoding apparatus, the configuration according to the present exemplary embodiment can be realized by directly transmitting motion vectors decoded by the first prediction residual decoding unit 705 and the second prediction residual decoding unit 715 via the directly connected interface. As a result, it is feasible to perform parallel decoding on a plurality of images while decoding a motion vector. Further, it is feasible to improve the processing speed in decoding processing and reduce the usage band of the main storage unit.

Further, it is useful to combine all of the above-mentioned exemplary embodiments. For example, a system can be configured to include three or more encoding units or decoding units. Motion vector information can be directly transmitted between encoding units or between decoding units in response to a register access from the CPU.

A software program is usable to realize the present disclosure. A system configuration capable of performing parallel encoding processing on a plurality of images using a multithread program is described below as an exemplary embodiment of the present disclosure. To perform parallel encoding processing on a plurality of images using the multithread program, it is necessary to use the number of encoded macroblock lines commonly between encoding threads. In the present exemplary embodiment, a common memory exclusively controlled with a semaphore is used to transmit the number of encoded macroblock lines and a plurality of encoding threads is used to perform parallel encoding on a plurality of images. In the present exemplary embodiment, the usage of the semaphore is intended to synchronize the writing timing of the number of encoded macroblock lines between a plurality of encoding threads.

Figure 14:
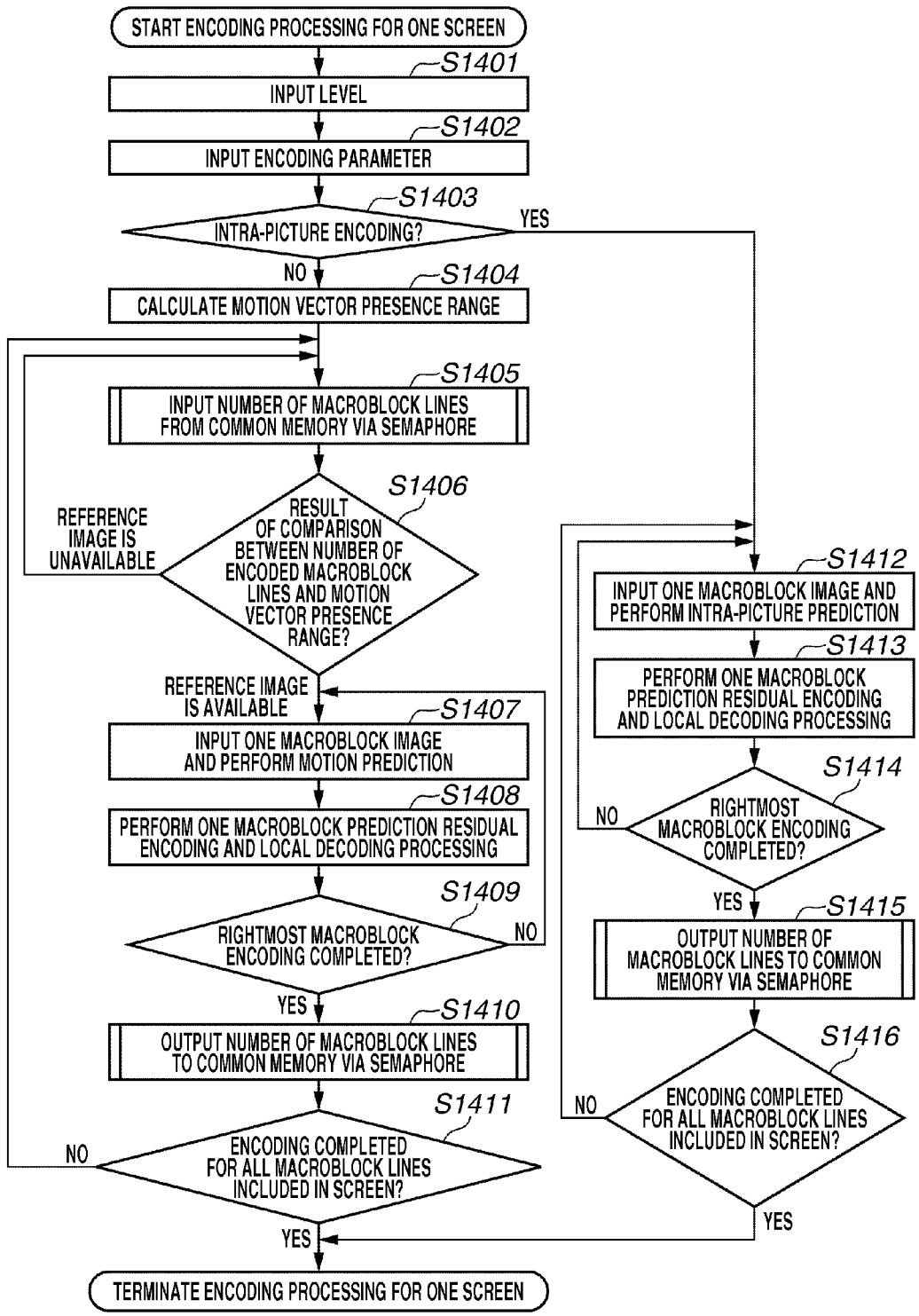
FIG. 14 is a flowchart illustrating processing of each encoding thread according to an eighth exemplary embodiment.
Figure 15:
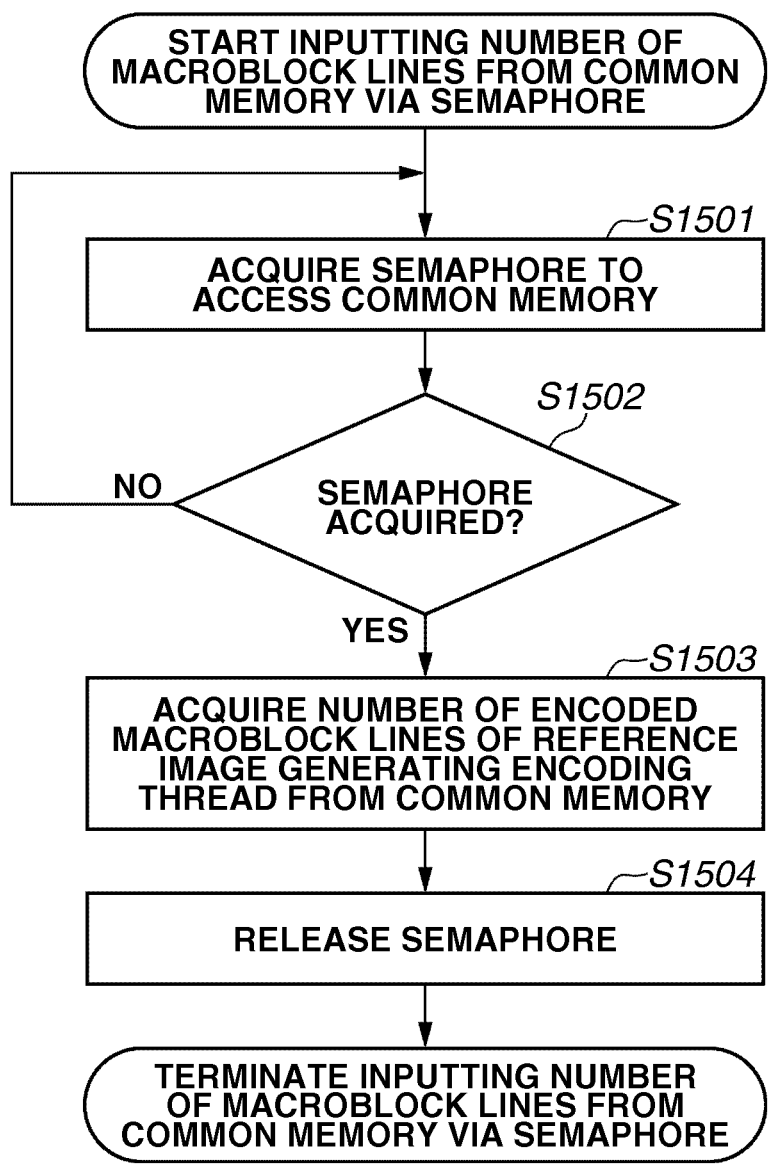
FIG. 15 is a flowchart illustrating processing for inputting the number of macroblock lines via a semaphore according to the eighth exemplary embodiment.
Figure 16:
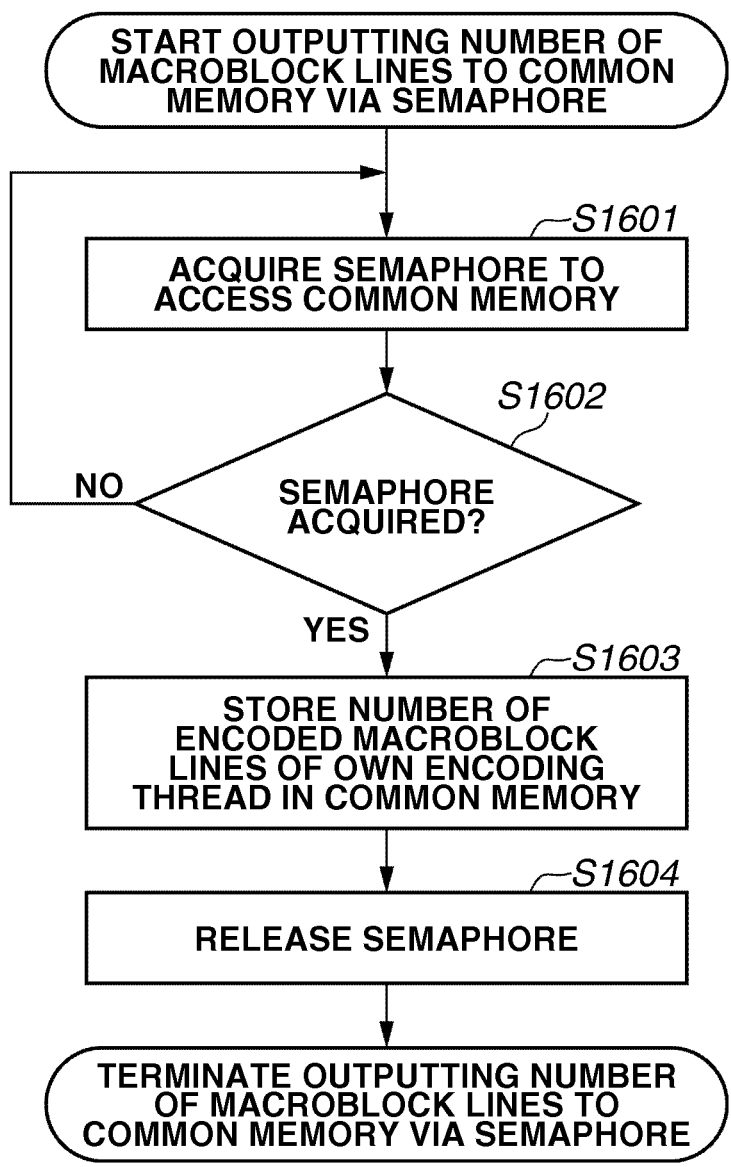
FIG. 16 is a flowchart illustrating processing for outputting the number of macroblock lines via the semaphore according to the eighth exemplary embodiment.

FIGS. 14, 15, and 16 are flowcharts illustrating processing for encoding a piece of image in a thread, in a case where a plurality of encoding threads is used to perform parallel encoding processing on a plurality of images (in which each thread encodes a different image). Similar to the second exemplary embodiment, the system according to the present exemplary embodiment performs the encoding processing for each macroblock including 16×16 pixels. Further, the system according to the present exemplary embodiment calculates a motion vector presence range based on the level in such a way as to adaptively determine the processing start timing for each macroblock line.

In step S1401, the encoding thread reads a level to be used in the encoding processing from an external device.

In step S1402, the encoding thread reads an encoding parameter from an external device. The encoding parameter designates the intra-picture prediction or the inter-picture prediction to be selected to encode a processing target image.

If it is determined that the processing target image is to be subjected to the intra-picture encoding (YES in step S1403), the operation proceeds to step S1412. If it is determined that the processing target image is to be subjected to the inter-picture encoding or the bidirectional inter-picture encoding (NO in step S1403), the operation proceeds to step 1404.

In step S1404, the encoding thread inputs a positive maximum value of the motion vector in the vertical direction that corresponds to the level acquired in step S1401, as a motion vector presence range.

In step S1405, the encoding thread inputs the number of macroblock lines encoded by an external encoding thread that generates a reference image from the common memory via the semaphore.

In step S1406, the encoding thread compares the number of macroblock lines having been input in step S1405 with the positive maximum value of the motion vector in the vertical direction having been input in step S1404 using the following formula. The encoding thread obtains a division result by rounding off fractions in the following formula. The sign of inequality used in the following formula does not include an equal sign because one macroblock is additionally used to generate a non-integer-pel. However, if the motion vector is limited to an integer pixel motion vector, the sign of inequality to be used in the following formula includes an equal sign.

number of encoded macroblock lines>(maximum value of motion vector in vertical direction/16+1)

If the above-mentioned condition is satisfied in step S1406, a reference image used in inter-picture encoding of the macroblock line is available. Therefore, the operation proceeds to step S1407. If the above-mentioned condition is not satisfied, the operation returns to step S1405 to delay the start timing of the macroblock line encoding processing.

In step S1407, the encoding thread reads an input image corresponding to one macroblock and the reference image, and determines a motion vector to be used in a motion search and performing the encoding. The encoding thread performs motion prediction using the determined motion vector and calculates a prediction residual.

In step S1408, the encoding thread performs encoding processing for the prediction residual of the macroblock and prediction encoding processing for the motion vector. Then, the encoding thread outputs an encoded stream. Similar to the first exemplary embodiment, the orthogonal transformation, the quantization, and the entropy encoding are usable to realize the prediction residual encoding processing. Further, in step S1408, the encoding thread performs local decoding for generation of the reference image.

In step S1409, the encoding thread determines whether the encoding processing has been completed for the rightmost macroblock of the image. If it is determined that the encoding processing for the rightmost macroblock is not yet completed (NO in step S1409), the operation returns to step S1407. The encoding thread repeats the processing of steps S1407 and S1408. If it is determined that the encoding processing for the rightmost macroblock macroblock completes (YES in step S1409), the operation proceeds to step S1410.

In step S1410, the encoding thread outputs the number of encoded macroblock lines to the common memory via the semaphore upon completing the encoding processing of one complete macroblock line.

In step S1411, the encoding thread determines whether the encoding processing has been completed for all macroblock lines included in the image. If it is determined that the encoding processing for all macroblock lines included in the image is not yet completed (NO in step S1411), the operation returns to step S1405. If it is determined that the encoding processing has been completed for all macroblock lines included in the image (YES in step S1411), the encoding thread completes the encoding processing of the target image.

In steps S1412 to S1414, the encoding thread performs intra-picture encoding, prediction residual encoding, and local decoding processing for one macroblock line, similar to the first exemplary embodiment. In the intra-picture encoding, the encoding thread does not input the number of macroblock lines being subjected to the processing using the semaphore because there is not any dependency between images.

In step S1415, upon completing the encoding processing for one complete macroblock line, the encoding thread outputs the number of processed macroblock lines via the semaphore to notify other thread of the progress in the generation of a particular reference image.

In step S1416, the encoding thread determines whether the processing has been completed for all macroblock lines included in the image. If it is determined that the processing is not yet completed (NO in step S1416), the operation returns to step S1412. If it is determined that the processing has been entirely completed (YES in step S1416), the encoding thread completes the encoding processing for the target image.

FIG. 15 is a flowchart illustrating details of the processing to be performed in step S1405 illustrated in FIG. 14, in which the encoding thread inputs the number of macroblock lines encoded by the external encoding thread from the common memory via the semaphore.

In step S1501, the encoding thread issues a semaphore acquisition command to access the common memory.

If the semaphore has been successfully acquired (YES in step S1502), the operation proceeds to step S1503. If no semaphore can be acquired (because another thread is currently accessing) (NO in step S1502), the operation returns to step S1501.

In step S1503, the encoding thread acquires the number of macroblock lines encoded by the external encoding thread from the common memory and inputs the state of a generation reference image.

In step S1504, the encoding thread releases the semaphore so that another thread can access the common memory.

FIG. 16 is a flowchart illustrating details of the processing to be performed in steps S1410 and S1415 illustrated in FIG. 14, in which the encoding thread outputs the number of encoded macroblock lines to the common memory via the semaphore. In the present exemplary embodiment, the processing illustrated in FIG. 16 includes transmitting the state of a reference image generated by its own thread to another encoding thread.

In step S1601, the encoding thread issues a semaphore acquisition command to access the common memory.

If the semaphore has been successfully acquired (YES in step S1602), the operation proceeds to step S1603. If no semaphore can be acquired (because another thread is currently accessing) (NO in step S1602), the operation returns to step S1601.

In step S1603, the encoding thread records the number of macroblock lines encoded by its own thread into the common memory.

In step S1604, the encoding thread releases the semaphore so that another thread can access the common memory.

As mentioned above, when the multithread program is used to perform parallel encoding processing on a plurality of images, the common memory that is exclusively controlled by the semaphore enables a plurality of encoding threads to commonly use the number of encoded macroblock lines. As a result, it can be assured that a reference image is available in each encoding thread. If different cores of a multi-core CPU are selectively available to execute each encoding thread of the multithread program, it becomes feasible to improve the processing speed in performing the parallel encoding processing on a plurality of images.

To simplify the flowchart contents illustrated in FIG. 14, the system is configured to perform inter-picture encoding processing on all macroblocks included in an image based on the inter-picture prediction. However, the present disclosure is not limited to the above-mentioned example. Further, the system can be configured to perform inter-picture encoding processing while performing intra-picture encoding processing on a part of macroblocks included in an image.

The present disclosure is applicable to a decoding thread program. A software program is usable to realize any one of the first to seventh exemplary embodiments. The number of threads that constitute a multi-thread is not limited to the above-mentioned value. In other words, it is feasible to use M (M is an arbitrary integer that is equal to or greater than 2) threads. Further, the above-mentioned exclusive control for the common memory is not limited to the semaphore. For example, a mutex having similar functions is available to obtain similar effects.

In the first to eighth exemplary embodiments, the apparatus starts processing a processing target block of an encoding target image when the processing of a part of a reference image to be used in the inter-picture encoding of the target image (i.e., a portion corresponding to a motion vector presence range of an initial processing target block of the target image) is completed. However, the present disclosure is not limited to the above-mentioned embodiments. For example, the apparatus can start processing the initial processing block of the target image when a predetermined time has elapsed after the processing of the portion corresponding to the motion vector presence range of the initial processing target block of the target image has been completed. In this case, the processing start timing is not limited to the processing completion timing of the portion corresponding to the motion vector presence range. For example, the apparatus can start the processing after completing the processing of a predetermined number of macroblock lines included in the motion vector presence range in the vertical direction. Further, the processing start timing can be set to the processing completion timing of the motion vector presence range calculated based on the slice or tile size.

Further, in the above-mentioned first to eighth exemplary embodiments, the image encoding apparatus is configured to include a plurality of encoding units, and the image decoding apparatus is configured to include a plurality of decoding units. However, the image encoding apparatus and the image decoding apparatus described in the first to eighth exemplary embodiments can be configured as an image encoding system and an image decoding system. In this case, for example, in FIG. 1, the first encoding unit and the second encoding unit can be configured as two independent image encoding apparatuses. In other words, the configuration illustrated in FIG. 1 can be modified in such a way as to realize an image encoding system that includes two image encoding apparatuses.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-165945 filed Jul. 26, 2012, which is hereby incorporated by reference herein in its entirety.

What is claimed is:

1. An image encoding apparatus configured to encode a plurality of images that is temporally continuous on a block-by-block basis, the image encoding apparatus comprising:
    a first encoding unit configured to encode an N-th image of the plurality of images;
    a second encoding unit configured to encode an (N+1)th image, which is continuous to the N-th image, with reference to the N-th image;
    a recording unit configured to record a number of block lines processed by the first encoding unit; and
    a control unit configured to control processing start timing for the first encoding unit and the second encoding unit,
    wherein the control unit is configured to instruct the second encoding unit to start encoding an initial processing target block of the (N+1)th image after the number of block lines recorded by the recording unit reaches a number of block lines that include a motion vector presence range, which is a range in which a motion vector is possibly present.

2. The image encoding apparatus according to claim 1, further comprising:
    a storage unit configured to store a motion vector having been searched by the first encoding unit,
    wherein the second encoding unit is configured to acquire the motion vector from the storage unit when the control unit has instructed to start encoding an initial processing target block of the (N+1)th image.

3. The image encoding apparatus according to claim 1, wherein the second encoding unit is configured to perform encoding processing based on a motion vector of the initial processing target block, and the motion vector presence range is determined based on a range of the N-th image to be referred to when the motion vector is searched.

4. The image encoding apparatus according to claim 1, wherein the motion vector presence range is determined based on a level indicating a parameter value range that can be decoded by an image decoding apparatus that performs decoding processing on an encoded stream, which can be received from the first encoding unit and the second encoding unit.

5. An image encoding apparatus configured to encode a plurality of images that is temporally continuous, the image encoding apparatus comprising:
    a first encoding unit configured to encode an N-th image of the plurality of images;
    a second encoding unit configured to encode an (N+1)th image, which is continuous to the N-th image, with reference to the N-th image;

a recording unit configured to record a number of tiles processed by the first encoding unit; and a control unit configured to control processing start timing for the first encoding unit and the second encoding unit, wherein the control unit is configured to instruct the second encoding unit to start encoding an initial processing target block of the (N+1)th image after the number of tiles recorded by the recording unit reaches a number of tiles that include a motion vector presence range.

6. An image encoding apparatus configured to encode a plurality of images that is temporally continuous, the image encoding apparatus comprising:

a first encoding unit configured to encode an N-th image of the plurality of images;

a second encoding unit configured to encode an (N+1)th image, which is continuous to the N-th image, with reference to the N-th image;

a recording unit configured to record a number of slices processed by the first encoding unit; and a control unit configured to control processing start timing for the first encoding unit and the second encoding unit, wherein the control unit is configured to instruct the second encoding unit to start encoding an initial processing target block of the (N+1)th image after the number of slices recorded by the recording unit reaches a number of slices that include a motion vector presence range.

7. An image decoding apparatus configured to decode a plurality of images that is temporally continuous, the image decoding apparatus comprising:

a first decoding unit configured to decode an N-th image of the plurality of images;

a second decoding unit configured to decode an (N+1)th image, which is continuous to the N-th image, with reference to the N-th image;

a recording unit configured to record a number of block lines processed by the first decoding unit; and a control unit configured to control processing start timing for the first decoding unit and the second decoding unit, wherein the control unit is configured to instruct the second decoding unit to start decoding an initial processing target block of the (N+1)th image after the number of block lines recorded by the recording unit reaches a number of block lines that include a motion vector presence range.

8. An image decoding apparatus configured to decode a plurality of images that is temporally continuous, the image decoding apparatus comprising:

a first decoding unit configured to decode an N-th image of the plurality of images;

a second decoding unit configured to decode an (N+1)th image, which is continuous to the N-th image, with reference to the N-th image;

a recording unit configured to record a number of tiles processed by the first decoding unit; and a control unit configured to control processing start timing for the first decoding unit and the second decoding unit, wherein the control unit is configured to instruct the second decoding unit to start decoding an initial processing target block of the (N+1)th image after the number of tiles recorded by the recording unit reaches a number of tiles that include a motion vector presence range.

9. An image decoding apparatus configured to decode a plurality of images that is temporally continuous, the image decoding apparatus comprising:

a first decoding unit configured to decode an N-th image of the plurality of images;

a second decoding unit configured to decode an (N+1)th image, which is continuous to the N-th image, with reference to the N-th image;

a recording unit configured to record a number of slices processed by the first decoding unit; and a control unit configured to control processing start timing for the first decoding unit and the second decoding unit, wherein the control unit is configured to instruct the second decoding unit to start decoding an initial processing target block of the (N+1)th image after the number of slices recorded by the recording unit reaches a number of slices that include a motion vector presence range.

10. An image encoding system configured to encode a plurality of images that is temporally continuous, the image encoding system comprising:

a first encoding unit configured to encode an N-th image of the plurality of images;

a second encoding unit configured to encode an (N+1)th image, which is continuous to the N-th image, with reference to the N-th image;

a recording unit configured to record a number of block lines processed by the first encoding unit; and a control unit configured to control processing start timing for the first encoding unit and the second encoding unit, wherein the control unit is configured to instruct the second encoding unit to start encoding an initial processing target block of the (N+1)th image after the number of block lines recorded by the recording unit reaches a number of block lines that include a motion vector presence range.

11. An image decoding system configured to decode a plurality of images that is temporally continuous, the image decoding system comprising:

a first decoding unit configured to decode an N-th image of the plurality of images;

a second decoding unit configured to decode an (N+1)th image, which is continuous to the N-th image, with reference to the N-th image;

a recording unit configured to record a number of block lines processed by the first decoding unit; and a control unit configured to control processing start timing for the first decoding unit and the second decoding unit, wherein the control unit is configured to instruct the second decoding unit to start decoding an initial processing target block of the (N+1)th image after the number of block lines recorded by the recording unit reaches a number of block lines that include a motion vector presence range.

12. An image encoding method for encoding a plurality of images that is temporally continuous, the image encoding method comprising:

encoding an N-th image of the plurality of images;

encoding an (N+1)th image, which is continuous to the N-th image, with reference to the N-th image;

recording a number of block lines processed in the encoding of the N-th image; and controlling processing start timing for the encoding of the N-th image and the encoding of the (N+1)th image, wherein the control of the processing start timing includes instructing to start encoding an initial processing target block of the (N+1)th image, after the recorded number of block lines reaches a number of block lines that include a motion vector presence range.

13. An image decoding method for decoding a plurality of images that is temporally continuous, the image decoding method comprising:

decoding an N-th image of the plurality of images;

decoding an (N+1)th image, which is continuous to the N-th image, with reference to the N-th image;

recording a number of block lines processed in the decoding of the N-th image; and controlling processing start timing for the decoding of the N-th image and the decoding of the (N+1)th image, wherein the control of the processing start timing includes instructing to start decoding an initial processing target block of the (N+1)th image, after the recorded number of block lines reaches a number of block lines that includes a motion vector presence range.

14. A non-transitory computer-readable storage medium storing a program for causing a computer to execute image encoding processing, the program comprising:

computer-executable instructions for encoding a plurality of images that is temporally continuous;

computer-executable instructions for encoding an N-th image of the plurality of images;

computer-executable instructions for encoding an (N+1)th image, which is continuous to the N-th image, with reference to the N-th image;

computer-executable instructions for recording a number of block lines processed in the encoding of the N-th image; and computer-executable instructions for controlling processing start timing for the encoding of the N-th image and encoding of the (N+1)th image, wherein the control of the processing start timing includes instructing to start encoding an initial processing target block of the (N+1)th image, after the recorded number of block lines reaches a number of block lines that include a motion vector presence range.

15. A non-transitory computer-readable storage medium storing a program for causing a computer to execute image decoding processing, the program comprising:

computer-executable instructions for decoding a plurality of images that is temporally continuous;

computer-executable instructions for decoding an N-th image of the plurality of images;

computer-executable instructions for decoding an (N+1)th image, which is continuous to the N-th image, with reference to the N-th image;

computer-executable instructions for recording a number of block lines processed in the decoding of the N-th image; and computer-executable instructions for controlling processing start timing for the decoding of the N-th image and the decoding of the (N+1)th image;

wherein the control of the processing start timing includes instructing to start decoding an initial processing target block of the (N+1)th image, after the recorded number of block lines reaches a number of block lines that include a motion vector presence range.

\* \* \* \* \*